United States Patent
Ozturk et al.

(10) Patent No.: US 10,966,225 B2
(45) Date of Patent: *Mar. 30, 2021

(54) UPLINK DATA TRANSFER FOR WIRELESS COMMUNICATIONS WITH MIXED TRANSMISSION TIME INTERVALS

(71) Applicant: QUALCOMM Incorporated, San Diego, CA (US)

(72) Inventors: Ozcan Ozturk, San Diego, CA (US); Wanshi Chen, San Diego, CA (US); Shimman Arvind Patel, San Diego, CA (US); Jing Sun, San Diego, CA (US); Seyedkianoush Hosseini, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/570,076

(22) Filed: Sep. 13, 2019

(65) Prior Publication Data

US 2020/0037340 A1  Jan. 30, 2020

Related U.S. Application Data

(63) Continuation of application No. 15/807,005, filed on Nov. 8, 2017, now Pat. No. 10,420,128.

(Continued)

(51) Int. Cl.
*H04W 4/00* (2018.01)
*H04W 72/12* (2009.01)
(Continued)

(52) U.S. Cl.
CPC ....... *H04W 72/1247* (2013.01); *H04L 5/0078* (2013.01); *H04W 28/0278* (2013.01);
(Continued)

(58) Field of Classification Search
None
See application file for complete search history.

(56) References Cited

U.S. PATENT DOCUMENTS 9,295,077 B2   3/2016   Guo et al.
10,420,128 B2  9/2019   Ozturk et al.
(Continued)

OTHER PUBLICATIONS

ETRI: "Consideration on Heterogeneous TTIs in a Carrier", 3GPP Draft; R2-154563, 3rd Generation Partnership Project (3GPP), Mobile Competence Centre; 650, Route Des Lucioles; F-06921 Sophia-Anti Polis Cedex; France, vol. RAN WG2, No. Malmo, Sweden; Oct. 4, 2015, XP051005097, Retrieved from the Internet: URL:http://www.3gpp.org/ftp/Meetings_3GPP_SYNC/RAN2/Docs/ [retrieved on Oct. 4, 2015], 5 pages.

(Continued)

*Primary Examiner* — Elisabeth Benoit Magloire
(74) *Attorney, Agent, or Firm* — Holland & Hart LLP

(57) ABSTRACT

Described techniques provide for prioritization of radio bearers and logical channels based on mixed transmission time interval (TTI) durations or numerologies of the bearers or logical channels. Two or more bearers may be identified for uplink data transmission that carry data to be transmitted using different TTI durations or numerologies. Each bearer may be prioritized based on the associated bearer type, TTI duration or numerology, or combinations thereof. Additionally, one or more logical channels may be associated with one or more bearers, and also prioritized based on the associated bearer type, TTI duration or numerology, or combinations thereof. A buffer status report (BSR) may be generated that has one or more portions associated with the different priorities of bearers or logical channels. Buffer information associated with the higher priority bearers or logical channels may be provided ahead of buffer informa- (Continued)

tion associated with lower priority bearers or logical channels.

30 Claims, 18 Drawing Sheets

Related U.S. Application Data

(60) Provisional application No. 62/421,077, filed on Nov. 11, 2016.

(51) Int. Cl.
*H04L 5/00* (2006.01)
*H04W 28/02* (2009.01)
*H04W 76/15* (2018.01)

(52) U.S. Cl.
CPC ............ *H04L 5/001* (2013.01); *H04L 5/0044* (2013.01); *H04L 5/0053* (2013.01); *H04W 72/1268* (2013.01); *H04W 72/1284* (2013.01); *H04W 76/15* (2018.02)

(56) References Cited

U.S. PATENT DOCUMENTS

| | | |
|---|---|---|
| 2003/0185193 A1 | 10/2003 | Choi et al. |
| 2011/0170495 A1 | 7/2011 | Earnshaw et al. |
| 2014/0105187 A1 | 4/2014 | Das et al. |
| 2015/0092542 A1 | 4/2015 | Yang et al. |
| 2015/0256303 A1 | 9/2015 | Belghoul et al. |
| 2016/0142934 A1 | 5/2016 | Ahmadzadeh et al. |
| 2016/0285775 A1 | 9/2016 | Damnjanovic et al. |
| 2017/0215160 A1* | 7/2017 | Lohr .................... H04W 76/10 |
| 2017/0230928 A1* | 8/2017 | Basu Mallick ... H04W 56/0045 |
| 2017/0279727 A1 | 9/2017 | Kodali et al. |
| 2018/0255499 A1* | 9/2018 | Loehr ................ H04B 7/2606 |
| 2019/0246414 A1* | 8/2019 | Yang .................... H04L 5/0091 |

OTHER PUBLICATIONS

International Search Report and Written Opinion—PCT/US2017/060924—ISA/EPO—dated Feb. 1, 2018.

* cited by examiner

UPLINK DATA TRANSFER FOR WIRELESS COMMUNICATIONS WITH MIXED TRANSMISSION TIME INTERVALS

CROSS REFERENCES

The present Application for Patent is a Continuation of U.S. patent application Ser. No. 15/807,005 by Ozturk, et al., entitled, "Uplink Data Transfer For Wireless Communications With Mixed Transmission Time Intervals" filed Nov. 8, 2017, which claims priority to U.S. Provisional Patent Application No. 62/421,077 by Ozturk, et al., entitled "Uplink Data Transfer For Wireless Communications With Mixed Transmission Time Intervals," filed Nov. 11, 2016, each of which is assigned to the assignee hereof and incorporated by reference herein.

BACKGROUND

The following relates generally to wireless communication and more specifically to uplink data transfer for wireless communications with mixed transmission time intervals (TTIs).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use orthogonal frequency division multiple access (OFDMA) on the downlink, single-carrier frequency division multiple access (SC-FDMA) on the uplink, and multiple-input multiple-output (MIMO) antenna technology.

In some examples, a wireless multiple-access communication system may include a number of base stations, each simultaneously supporting communication for multiple communication devices, otherwise known as user equipment (UEs). In an LTE or LTE-Advanced (LTE-A) network, a set of one or more base stations may define an eNodeB (eNB). In other examples (e.g., in a next generation new radio (NR) or Fifth Generation (5G) network), a wireless multiple access communication system may include a number of smart radio heads (RHs) in communication with a number of access node controllers (ANCs), where a set of one or more RHs, in communication with an ANC, defines a base station (e.g., an eNB or next generation NodeB (gNB)). A base station may communicate with a set of UEs on downlink channels (e.g., for transmissions from a base station to a UE) and uplink channels (e.g., for transmissions from a UE to a base station).

A base station in some LTE or NR deployments may transmit to one or more UEs using multiple different TTIs that may include a shortened TTI (sTTI) that has a reduced length relative to a 1 millisecond (1 ms) or legacy LTE TTI. Users communicating using sTTIs may be referred to as low latency users. An sTTI may be a subset of one or more subframes that correspond to 1 ms or legacy TTI subframes. A UE may have data that is to be transmitted using different TTIs, and efficient identification and reporting of such data may help enhance network efficiency.

SUMMARY

The described techniques relate to improved methods, systems, devices, or apparatuses that support uplink data transfer for wireless communications with mixed transmission time intervals (TTIs). Generally, the described techniques provide for prioritization of radio bearers and logical channels based on associated TTI durations or numerologies, and reporting of buffer status reports (BSRs) based on the prioritization. In some cases, two or more bearers may be identified for uplink data transmission that carry data to be transmitted using different TTI durations or numerologies. Each bearer may be prioritized based on the associated bearer type, TTI duration or numerology, or combinations thereof. Additionally, one or more logical channels may be associated with one or more bearers, and also prioritized based on the associated bearer type, TTI duration or numerology, or combinations thereof. In some examples, a BSR may be generated that has one or more portions associated with the different priorities of bearers or logical channels. Buffer information associated with the higher priority bearers or logical channels may be provided ahead of buffer information associated with lower priority bearers or logical channels in the event that resources are available for only one portion of the BSR.

A method for wireless communication is described. The method may include identifying two or more bearers for an uplink data transmission from a UE to a base station, each bearer having a bearer type, associating one or more different TTI durations with each of the two or more bearers, prioritizing each bearer of the two or more bearers based at least in part on the associated one or more TTI durations or the bearer type, and transmitting the uplink data transmission during an uplink TTI based at least in part on the prioritization.

An apparatus for wireless communication is described. The apparatus may include means for identifying two or more bearers for an uplink data transmission from a UE to a base station, each bearer having a bearer type, means for associating one or more different TTI durations with each of the two or more bearers, means for prioritizing each bearer of the two or more bearers based at least in part on the associated one or more TTI durations or the bearer type, and means for transmitting the uplink data transmission during an uplink TTI based at least in part on the prioritization.

Another apparatus for wireless communication is described. The apparatus may include a processor, memory in electronic communication with the processor, and instructions stored in the memory. The instructions may be operable to cause the processor to identify two or more bearers for an uplink data transmission from a UE to a base station, each bearer having a bearer type, associate one or more different TTI durations with each of the two or more bearers, prioritize each bearer of the two or more bearers based at least in part on the associated one or more TTI durations or the bearer type, and transmit the uplink data transmission during an uplink TTI based at least in part on the prioritization.

A non-transitory computer readable medium for wireless communication is described. The non-transitory computer-readable medium may include instructions operable to cause a processor to identify two or more bearers for an uplink data transmission from a UE to a base station, each bearer having a bearer type, associate one or more different TTI durations with each of the two or more bearers, prioritize each bearer of the two or more bearers based at least in part on the associated one or more TTI durations or the bearer type, and transmit the uplink data transmission during an uplink TTI based at least in part on the prioritization.

Some examples of the method, apparatus, and non-transitory computer-readable medium described above may further include processes, features, means, or instructions for transmitting a BSR associated with at least one of the two or more bearers based at least in part on the prioritization.

Some examples of the method, apparatus, and non-transitory computer-readable medium described above may further include processes, features, means, or instructions for identifying one or more logical channels for each of the two or more bearers, and prioritizing the identified logical channels based at least in part on the associated one or more TTI durations or the bearer type for each of the two or more bearers.

Some examples of the method, apparatus, and non-transitory computer-readable medium described above may further include processes, features, means, or instructions for logically grouping the two or more bearers into one or more logical groups based at least in part on TTI duration of each bearer, and transmitting a BSR associated with at least one of the one or more logical groups.

In some examples of the method, apparatus, and non-transitory computer-readable medium described above, the two or more bearers comprise a first bearer having a first bearer type and a second bearer having a second bearer type, and wherein a priority of the first bearer type and the second bearer type may be determined independently for each uplink TTI.

In some examples of the method, apparatus, and non-transitory computer-readable medium described above, the prioritizing each bearer further comprises identifying a first bearer having a first bearer type with a first bearer priority, the first bearer having a first TTI duration, identifying a second bearer having a second bearer type with a second bearer priority that may be lower than the first bearer priority, the second bearer having a second TTI duration that may be shorter than the first TTI duration, and prioritizing the second bearer to may have a higher priority than the first bearer based on the second TTI duration.

In some examples of the method, apparatus, and non-transitory computer-readable medium described above, the transmitting the BSR further comprises configuring a first portion of the BSR with buffer information associated with one or more higher priority bearers, configuring a second portion of the BSR with buffer information associated with one or more lower priority bearers, and transmitting the first portion of the BSR ahead of the second portion of the BSR.

Some examples of the method, apparatus, and non-transitory computer-readable medium described above may further include processes, features, means, or instructions for determining that resources for transmitting the BSR may be insufficient to transmit both the first portion of the BSR and the second portion of the BSR. Some examples of the method, apparatus, and non-transitory computer-readable medium described above may further include processes, features, means, or instructions for deferring transmission of the second portion of the BSR.

Some examples of the method, apparatus, and non-transitory computer-readable medium described above may further include processes, features, means, or instructions for determining that a second transmission of a second bearer type having a second TTI is to puncture an ongoing first transmission of a first bearer type having a first TTI that is longer than the second TTI, including buffer information associated with the ongoing first transmission of the first bearer type in the BSR, and transmitting the BSR in the second transmission.

Some examples of the method, apparatus, and non-transitory computer-readable medium described above may further include processes, features, means, or instructions for determining that a second transmission of a second bearer type having a second TTI is to be transmitted concurrently with an ongoing first transmission of a first bearer type having a first TTI that is longer than the second TTI, excluding buffer information associated with the ongoing first transmission of the first bearer type from the BSR, and transmitting the BSR in the second transmission.

Some examples of the method, apparatus, and non-transitory computer-readable medium described above may further include processes, features, means, or instructions for determining that a second transmission of a second bearer type having a second TTI is to be transmitted prior to completion of an ongoing first transmission of a first bearer type having a first TTI that is longer than the second TTI, determining whether to include or exclude buffer information associated with the ongoing first transmission of the first bearer type in the BSR based at least in part on a specified configuration or a configuration received in radio resource control (RRC) signaling, and transmitting the BSR in the second transmission.

Some examples of the method, apparatus, and non-transitory computer-readable medium described above may further include processes, features, means, or instructions for determining that the uplink data can be transmitted using a first TTI on a first component carrier or using a second TTI on a second component carrier, wherein the second TTI is longer than the first TTI, and selecting one of the first component carrier or the second component carrier for transmission of the uplink data based at least in part on a specified or a configured prioritization for transmission of the uplink data using the first TTI or the second TTI.

Some examples of the method, apparatus, and non-transitory computer-readable medium described above may further include processes, features, means, or instructions for associating one or more different numerologies with each of the two or more bearers, and prioritizing each bearer of the two or more bearers based at least in part on the associated one or more numerologies.

A method for wireless communication is described. The method may include identifying two or more bearer types for uplink data transmissions from a UE, associating one or more different TTI durations with each of the two or more bearers types, prioritizing each bearer type of the two or more bearer types based at least in part on the associated one or more TTI durations, and configuring the UE to transmit an uplink transmission during an uplink TTI based at least in part on the prioritization.

An apparatus for wireless communication is described. The apparatus may include means for identifying two or more bearer types for uplink data transmissions from a UE, means for associating one or more different TTI durations with each of the two or more bearers types, means for prioritizing each bearer type of the two or more bearer types based at least in part on the associated one or more TTI durations, and means for configuring the UE to transmit an uplink transmission during an uplink TTI based at least in part on the prioritization.

Another apparatus for wireless communication is described. The apparatus may include a processor, memory in electronic communication with the processor, and instructions stored in the memory. The instructions may be operable to cause the processor to identify two or more bearer types for uplink data transmissions from a UE, associate one or more different TTI durations with each of the two or more bearers types, prioritize each bearer type of the two or more bearer types based at least in part on the associated one or more TTI durations, and configure the UE to transmit an uplink transmission during an uplink TTI based at least in part on the prioritization.

A non-transitory computer readable medium for wireless communication is described. The non-transitory computer-readable medium may include instructions operable to cause a processor to identify two or more bearer types for uplink data transmissions from a UE, associate one or more different TTI durations with each of the two or more bearers types, prioritize each bearer type of the two or more bearer types based at least in part on the associated one or more TTI durations, and configure the UE to transmit an uplink transmission during an uplink TTI based at least in part on the prioritization.

Some examples of the method, apparatus, and non-transitory computer-readable medium described above may further include processes, features, means, or instructions for configuring the UE to transmit a BSR based at least in part on the prioritized bearer types.

Some examples of the method, apparatus, and non-transitory computer-readable medium described above may further include processes, features, means, or instructions for logically grouping the two or more bearer types into one or more logical groups based at least in part on the TTI duration of each bearer type, and configuring the UE to transmit a BSR associated with each of the one or more logical groups. In some examples of the method, apparatus, and non-transitory computer-readable medium described above, a priority of the two or more bearer types may be determined independently for each logical group of the one or more logical groups.

In some examples of the method, apparatus, and non-transitory computer-readable medium described above, the prioritizing each bearer type further comprises identifying a first bearer type with a first bearer priority, identifying a second bearer type with a second bearer priority that may be lower than the first bearer priority, and the configuring the UE further comprises configuring the UE to prioritize the second bearer type to have a higher priority than the first bearer type when the second bearer type is to be transmitted using a shorter duration TTI than the first bearer type, and configuring the UE to prioritize the first bearer type to have a higher priority than the second bearer type when the first bearer type is to be transmitted using a shorter duration TTI than, or a same duration TTI as, the second bearer type.

Some examples of the method, apparatus, and non-transitory computer-readable medium described above may further include processes, features, means, or instructions for configuring the UE to transmit a first portion of a BSR with buffer information associated with one or more higher priority bearer types ahead of a second portion of the BSR with buffer information associated with one or more lower priority bearer types.

Some examples of the method, apparatus, and non-transitory computer-readable medium described above may further include processes, features, means, or instructions for configuring the UE to include buffer information in the BSR associated with an ongoing first transmission of a first bearer type based at least in part on whether a second transmission punctures the ongoing first transmission or may be transmitted concurrently with the ongoing first transmission. In some examples of the method, apparatus, and non-transitory computer-readable medium described above, the configuring the UE to transmit the BSR may be performed through RRC signaling transmitted to the UE.

Some examples of the method, apparatus, and non-transitory computer-readable medium described above may further include processes, features, means, or instructions for associating one or more different numerologies with each of the two or more bearer types and prioritizing each bearer type of the two or more bearer types based at least in part on the associated one or more numerologies.

DETAILED DESCRIPTION

Figure 1:
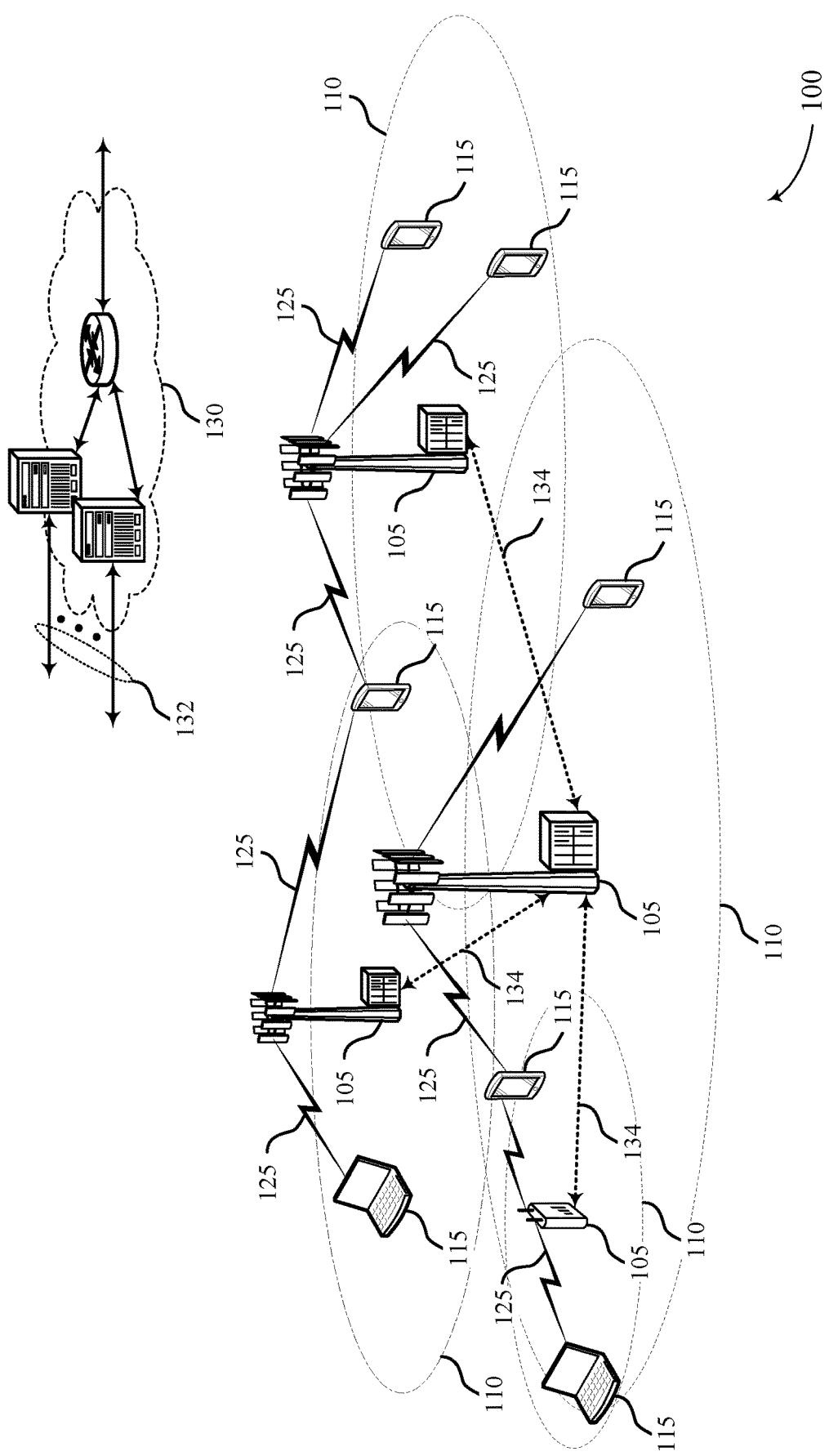
FIG. 1 illustrates an example of a system for wireless communication that supports uplink data transfer for wireless communications with mixed transmission time intervals (TTIs) in accordance with aspects of the present disclosure.

Improved methods, systems, devices, or apparatuses of various examples may be used to support uplink data transfer for wireless communications with mixed transmission time intervals (TTIs). Resources allocated for low latency communication may be used for uplink and downlink communication using shortened TTIs (sTTIs) that have a reduced length relative to TTIs of communications that may be relatively latency insensitive, such as enhanced mobile broadband (MBB) (eMBB) transmissions that may use a 1 ms TTI duration. Communications using sTTIs may use, in some cases, an sTTI duration that corresponds to one slot of a wireless subframe, or an sTTI duration that corresponds to two or three orthogonal frequency division multiplexing (OFDM) symbols.

Various techniques as disclosed herein may provide for prioritization, based at least in part on an associated TTI duration or numerology, of radio bearers and logical channels, and reporting of buffer status reports (BSRs) based on the prioritization. In some cases, two or more bearers may be identified for uplink data transmission that carry data, and that are configured with different TTI durations or numerologies. Each bearer may be prioritized based on the associated bearer type, TTI duration or numerology, or combinations thereof. Additionally, one or more logical channels may be associated with one or more bearers, and also prioritized based on the associated bearer type, TTI duration or numerology, or combinations thereof. In some examples, a BSR may be generated that has one or more portions associated with the different priorities of bearers or logical channels. Buffer information associated with the higher priority bearers or logical channels may be provided ahead of buffer information associated with lower priority bearers or logical channels in the event that resources are available for only one portion of the BSR.

Such low latency communications may be used in a system, for example, that may support multiple different services for data communications that may be selected depending upon the nature of the communications. For example, communications that require low latency and high reliability, sometimes referred to as mission critical (MiCr) communications, may be served through a lower-latency service (e.g., an ultra-reliable low-latency communication (URLLC) service) that uses sTTIs. Correspondingly, communications that are more delay-tolerant may be served through a service that provides relatively higher throughput with somewhat higher latency, such as an MBB service (e.g., an eMBB service) that uses 1 ms TTIs. In other examples, communications may be with user equipment (UEs) that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTI durations, different sub-carrier (or tone) spacing and different cyclic prefixes.

Aspects of the disclosure are initially described in the context of a wireless communications system. Aspects of the disclosure are further illustrated by and described with reference to apparatus diagrams, system diagrams, and flowcharts that relate to uplink data transfer for wireless communications with mixed TTIs.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) (or LTE-Advanced (LTE-A)) network, or a New Radio (NR) network. In some cases, wireless communications system 100 may support eMBB communications, ultra-reliable (e.g., MiCr or URLLC) communications, low latency communications, and communications with low-cost and low-complexity devices. The UEs 115, in some cases, may be configured by a base station 105 to support mixed TTI durations for communications, may prioritize bearers or channels based at least in part on an associated TTI duration or numerology, and may generate a BSR based on the prioritization (e.g., based on the TTI durations or numerologies associated with different bearers).

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a MTC device, an appliance, an automobile, a drone, or the like.

In some cases, a UE 115 may also be able to communicate directly with other UEs (e.g., using a peer-to-peer (P2P) or device-to-device (D2D) protocol). Some UEs 115, such as MTC or Internet of Things (IoT) devices, may be low cost or low complexity devices, and may provide for automated communication between machines, i.e., Machine-to-Machine (M2M) communication. M2M or MTC may refer to data communication technologies that allow devices to communicate with one another or a base station without human intervention. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions, and wireless communications system 100 may be configured to provide ultra-reliable and low latency communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may be an example of a LTE eNB, an LTE-A eNB, an NR gNB, an NR Node-B, an NR access node, and may include an access node controller (ANC).

A base station 105 may interface with the core network 130 through backhaul links 132 (e.g., S1, S2, NG-1, NG-2, NG-3, NG-C, NG-U, etc.) and may perform radio configuration and scheduling for communication with the UEs 115 within an associated coverage area 110. In various examples, the network devices 105-*b* may communicate, either directly or indirectly (e.g., through core network 130), with each other over backhaul links 134 (e.g., X1, X2, Xn etc.), which may be wired or wireless communication links. Each base station 105 may also communicate with a number of UEs 115 through a number of other network devices, where a network device may be an example of a transmission reception point (TRP), a distributed unit (DU), a radio head (RH), a remote radio head (RRH), or a smart radio head.

In some cases, wireless communications system 100 may be a packet-based network that operates according to a layered protocol stack. In the user plane, communications at the bearer or Packet Data Convergence Protocol (PDCP) layer may be internet protocol (IP)-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and a network device 105 or core network 130 supporting radio bearers for user plane data. At the Physical (PHY) layer, transport channels may be mapped to physical channels.

Wireless communications system 100 may support operation on multiple cells or carriers, a feature which may be referred to as carrier aggregation or multi-carrier operation. A carrier may also be referred to as a component carrier, a layer, a channel, etc. The terms "carrier," "component carrier," "cell," and "channel" may be used interchangeably herein. A UE 115 may be configured with multiple downlink component carriers and one or more uplink component carriers for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, and shorter TTIs. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). In some cases, an eCC may utilize a different symbol duration than other component carriers, which may include use of a reduced symbol duration as compared with symbol durations of the other component carriers. A shorter symbol duration may be associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. A Fifth Generation (5G) or NR carrier may be considered an eCC.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation configuration in conjunction with component carriers operating in a licensed band. Operations in unlicensed spectrum may include downlink transmissions, uplink transmissions, or both. Duplexing in unlicensed spectrum may be based on FDD, TDD or a combination of both.

Time intervals in LTE or NR may be expressed in multiples of a basic time unit and may be organized according to radio frames of length of 10 ms that may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). In some cases the subframe may be the smallest scheduling unit, also known as a TTI. In other cases, a TTI may be shorter than a subframe or may be dynamically selected (e.g., in sTTI bursts or in selected component carriers using sTTIs). Various examples discussed herein provide for UE 115 communications using multiple TTIs, including 1 ms TTIs and sTTIs, and prioritization of such communications that may allow for efficient scheduling and allocation of resources associated with different TTI durations.

In some cases, the numerology employed within a system (i.e., symbol size, subcarrier size, symbol-period duration, and/or TTI duration) may be selected or determined based on a type of communication. The numerology may be selected or determined in view of an inherent tradeoff between latency for low latency applications and efficiency for other applications, for example. In some cases, a resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. Resource blocks may be defined according to other numerologies in various examples.

As mentioned above, a UE 115 in wireless communications system 100 may be capable of providing multiple different services to a user such as, for example, URLLC services, eMBB services, or mMTC services. Each such service may have an associated Quality of Service (QoS)

target that the UE 115 seeks to maintain in order to provide a favorable user experience. In order to maintain the QoS, the UE 115 may identify different types of bearers each associated with a QoS, and the UE 115 may transmit data using a particular bearer based on the QoS target associated with the data. In some cases, each bearer may be configured for communications using a 1 ms TTI or an sTTI. Communications using the sTTI may be associated with lower latency than communications using the 1 ms TTI. In some wireless communications systems (e.g., LTE systems), the bearers may be prioritized based on the bearer type (e.g., the QoS target associated with the bearer).

In such systems, however, if a bearer of a particular type is configured for latency insensitive communications and a bearer of the same type is configured for low latency communications, the latency insensitive communications may be given priority to the low latency communications if data associated with the latency insensitive communications was identified before data associated with low latency communications. Further, if a bearer of a particular type configured for low latency communications is associated with a lower priority a bearer of another type configured for latency insensitive communications, the latency insensitive communications may be given priority to the low latency communications. Thus, a UE 115 may transmit latency insensitive data before low latency data, which may be detrimental to a wireless communications system. Wireless communications system 100 may support efficient techniques for prioritizing bearers based on TTI durations or numerologies associated with the bearers, such that low latency communications may be prioritized over latency insensitive communications.

Figure 2:
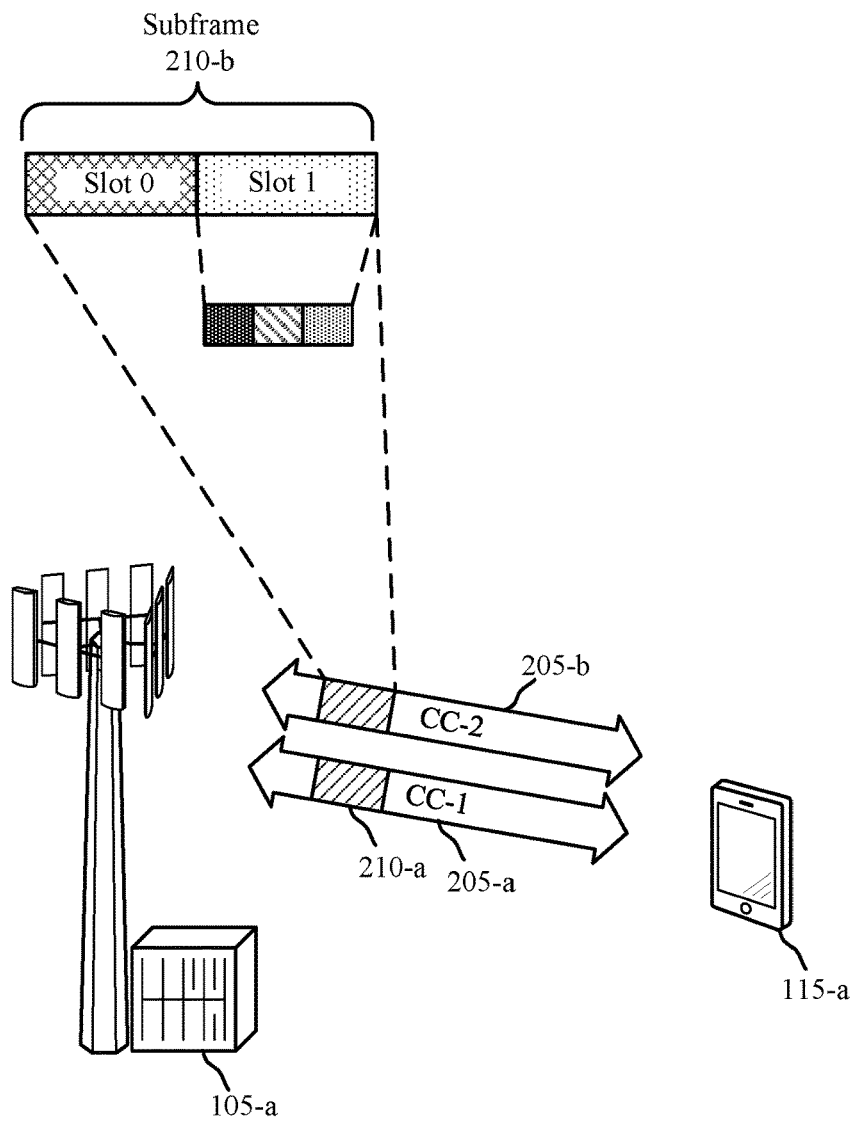
FIG. 2 illustrates an example of a wireless communications system that supports uplink data transfer for wireless communications with mixed TTIs in accordance with aspects of the present disclosure.
Figure 2:
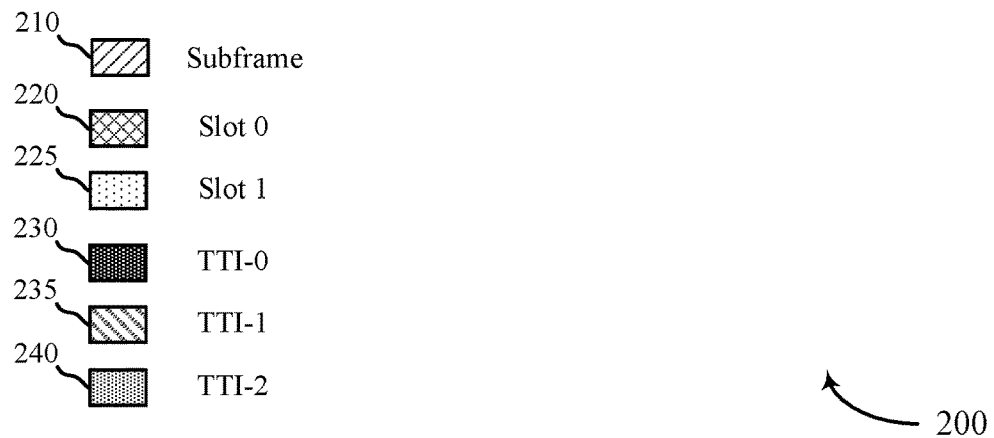

FIG. 2 illustrates an example of a wireless communications system 200 for uplink data transfer for wireless communications with mixed TTIs. Wireless communications system 200 includes base station 105-a and UE 115-a, which may be examples of the corresponding devices described above with reference to FIG. 1. In the example of FIG. 2, the wireless communications system 200 may operate according to a radio access technology (RAT) such as a 5G or NR RAT that may support communications using multiple different TTI durations, although techniques described herein may be applied to any RAT and to systems that may concurrently use two or more different RATs.

Base station 105-a may communicate with UE 115-a over carrier 205. In some examples, base station 105-a may allocate resources for communication with UEs over two or more component carriers 205, including a first component carrier 205-a and a second component carrier 205-b. Base station 105-a may allocate subframes 210 for communication with UE 115-a, and each of the subframes 210, in some examples, may correspond to a legacy LTE TTI (having a 1 ms duration) or a 5G or NR 1 ms TTI. In this example, subframes 210 may include a first subframe 210-a transmitted on the first component carrier 205-a, and a second subframe 210-b transmitted on the second component carrier 205-b. Each of the subframes 210 may include two slots, and each slot may have seven symbols for a normal cyclic prefix. In this example, a first slot (slot 0) 220 and a second slot (slot 1) 225 may be included in the second subframe 210-b.

As indicated above, in the uplink of a low latency system, different sTTI lengths may be used for transmissions over carriers 205. For example, two-symbol sTTI durations, three-symbol sTTI durations, and 1-slot sTTI durations may be supported for transmissions on a physical uplink control channel (PUCCH) and a physical uplink shared channel (PUSCH) (or shortened PUCCH (sPUCCH) and shortened PUSCH (sPUSCH)). Thus, within first slot 220 or second slot 225, there may be multiple sTTIs, such as a first sTTI (TTI-0) 230, a second sTTI (TTI-1) 235, and a third sTTI (TTI-2) 240, that may each have a two or three OFDM symbol duration. While various examples discussed herein are described with respect to uplink communications, such techniques may also apply to downlink communications in some examples.

The UE 115-b may, in some cases, concurrently support multiple TTI lengths, such as 1 ms TTIs and sTTIs, and in some cases, the UE 115-b can be scheduled with either or both of them at the same time. Simultaneous handling of two TTIs may be implemented, in some examples, through MAC layer processing associated with uplink data transfer of data that is to be transmitted using different TTIs. The MAC layer processing may provide logical channel multiplexing of different logical channels and radio bearers that may use different TTI durations. Additionally, buffer status reporting may be configured to differentiate BSRs for different groups of logical channels or bearers.

Figure 3:
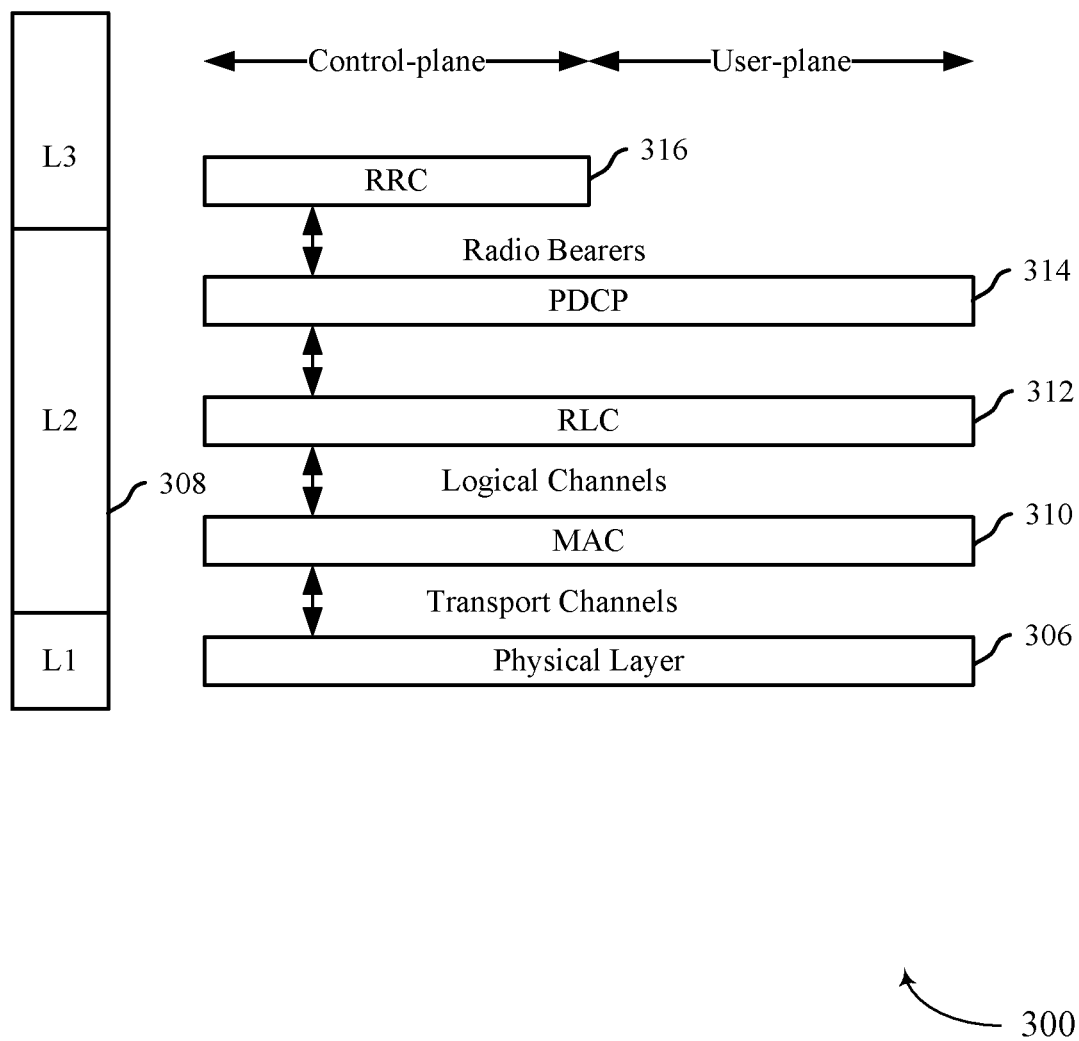
FIG. 3 illustrates an example of a radio protocol architecture that supports uplink data transfer for wireless communications with mixed TTIs in accordance with aspects of the present disclosure.

FIG. 3 illustrates an example of a radio protocol architecture 300 for uplink data transfer for wireless communications with mixed TTIs. The radio protocol architecture 300 may include three layers: Layer 1 (L1), Layer 2 (L2), and Layer 3 (L3). L3 may configure signaling protocols that may be used by a UE 115 and a base station 105 for transmissions across L1, while L2 may process and prepare control and user data for transmissions across L1. A UE 115 may use the information provided by the upper two layers to prepare uplink transmissions to a base station 105. L1 may be the lowest layer and may implement various physical layer signal processing functions. L1 may be referred to herein as the physical layer 306. L2 308 may be located above the physical layer 306 and may be responsible for the link between a UE 115 and a base station 105 over the physical layer 306. L2 may include a PDCP sublayer 314, an RLC sublayer 312, and a MAC sublayer 310, which may be terminated at the base station 105 on the network side. L3 may include the RRC layer 316 and, as discussed with reference to FIG. 1, may provide establishment, configuration, and maintenance of an RRC connection between a UE and a base station.

The PDCP sublayer 314 may provide multiplexing between different radio bearers and logical channels. The PDCP sublayer 314 may also provide header compression for upper layer data packets to reduce radio transmission overhead, security by ciphering the data packets, and handover support for UEs 115 between base stations 105. The RLC sublayer 312 may provide segmentation and reassembly of upper layer data packets, retransmission of lost data packets, and reordering of data packets to compensate for out-of-order reception due to HARQ. The RLC sublayer 312 may pass data to the MAC sublayer 310 through logical channels. According to some examples, a UE 115 may have separate logical channels to provide separate services to a user, such as services that may use a 1 ms TTI duration and services that may use an sTTI duration. The MAC sublayer 310 may provide multiplexing between logical and transport channels. An example of a transport channel may be an uplink shared channel (UL-SCH). The MAC sublayer 310 may also be responsible for allocating the various radio resources (e.g., resource blocks) in one cell among the UEs. The MAC sublayer 310 may also be responsible for HARQ operations. The MAC sublayer 310 may format and send the logical channel data to the physical layer through transport channels. The MAC sublayer 310 may additionally perform logical channel prioritization in accordance with various techniques as discussed herein.

In the user plane, a UE 115 or base station 105 may have several upper layers, including L3. L3 may be above L2 308 and may be a network layer (e.g., IP layer) that may be terminated at a packet data network (PDN) gateway on the network side, or may be an application layer that may be terminated at the other end of the connection (e.g., far end UE, server, etc.). A UE 115 may be capable of providing multiple different services to a user such as, for example, URLLC services, eMBB services, or mMTC services. Each such service may have an associated Quality of Service (QoS) target that the UE 115 seeks to maintain in order to have a favorable user experience.

As mentioned above, a UE 115 may be capable of providing multiple different services to a user, and the UE 115 may use different logical channels for one or more of such services. In some cases, a logical channel may be associated with one or more bearers that transport data associated with corresponding services. Different services may have an associated QoS target, and the UE 115 may be configured to use different TTIs for particular services to help achieve the QoS target (e.g., in order to provide a favorable user experience). Each bearer may be associated with one or more TTIs that may be identified based on a service provided by the bearer. In some cases, certain bearers may be configured for an sTTI, certain bearers may be configured with a 1 ms TTI, and some bearers may be configured for either a 1 ms TTI or sTTI, where either TTI may be used for such bearers. The bearers that may be configured for two or more TTIs may have different priorities for logical channel multiplexing and buffer status reporting for each TTI (e.g., a higher priority for 1 ms TTI and a lower priority for sTTI). Each bearer may have a logical channel identity (LCID) based on the service being transported using that bearer. An LCID may be used to determine which logical channel a certain bearer has been associated with. Each logical channel, including logical channels associated with a bearer, may be prioritized within the MAC layer of UE 115, for example, based on an associated TTI duration, QoS requirements for the service provided by the logical channel, or combinations thereof. For example, MiCr data transmitted using a URLLC service may have a high QoS requirement, and a logical channel for this service may have a high priority relative to logical channels that may support, for example, eMBB services.

Figure 4:
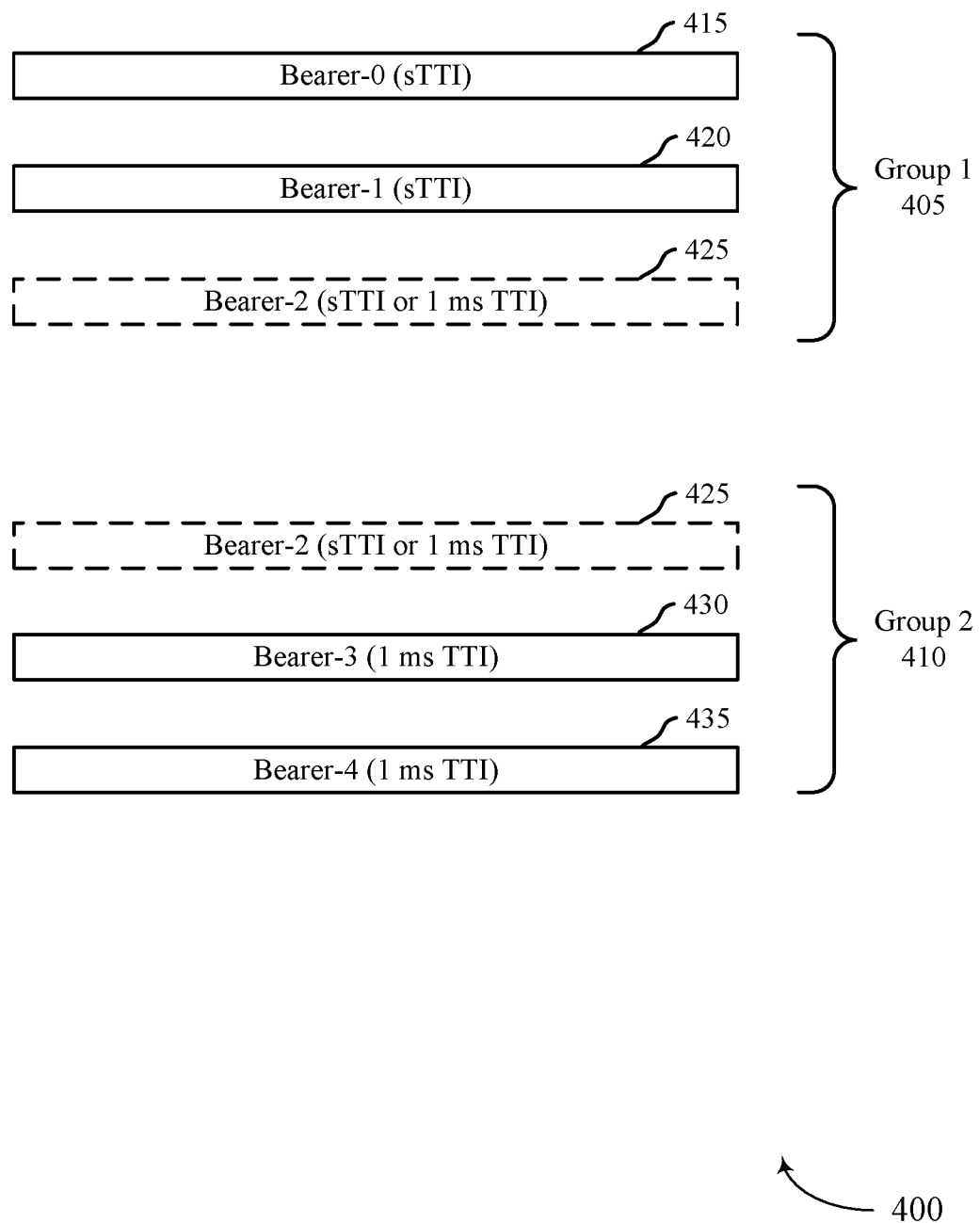
FIG. 4 illustrates an example of a grouping and prioritization of bearers that supports uplink data transfer for wireless communications with mixed TTIs in accordance with aspects of the present disclosure.

FIG. 4 illustrates an example of a grouping and prioritization of bearers 400 for uplink data transfer for wireless communications with mixed TTIs. The techniques of example FIG. 4 may be used, for example, in mixed TTI communications between a UE and a base station as discussed above with respect to FIGS. 1 and 2.

In this example, a first group (group 1) 405 of bearers may be used for sTTI transmissions, and a second group (group 2) 410 of bearers may be used for 1 ms TTI transmissions. In this example, a first bearer 415 and a second bearer 420 may be sTTI bearers that may be used for low latency transmissions during sTTIs. A third bearer 425 may be used for either 1 ms TTI or sTTI transmissions, and may be placed, for a particular TTI, within the first group 405 or the second group 410 based on which TTI duration is configured. Fourth bearer 430 and fifth bearer 435 may be used for latency insensitive transmissions (e.g., relative to low latency transmissions) during 1 ms TTIs. In some examples, the first group 405 and second group 410 may be configured by a base station. A logical channel, as discussed above, may be associated with a type of service, and in some cases logical channel groups may be configured by a base station to differentiate between BSRs. For example, only bearers which can be used for transmissions during sTTIs may be in a same logical channel group.

In some examples, a TTI priority may override the logical channel priority for uplink transmission, such that even if a transmission on a higher priority bearer is ongoing, scheduling of a transmission during an sTTI for a lower priority bearer may preempt that transmission. Additionally, logical channel priorities may be different for 1 ms TTI and sTTI (e.g., a logical channel may have a first priority for 1 ms TTI relative to other channels, and a different priority relative to the other channels for sTTI).

Figure 5:
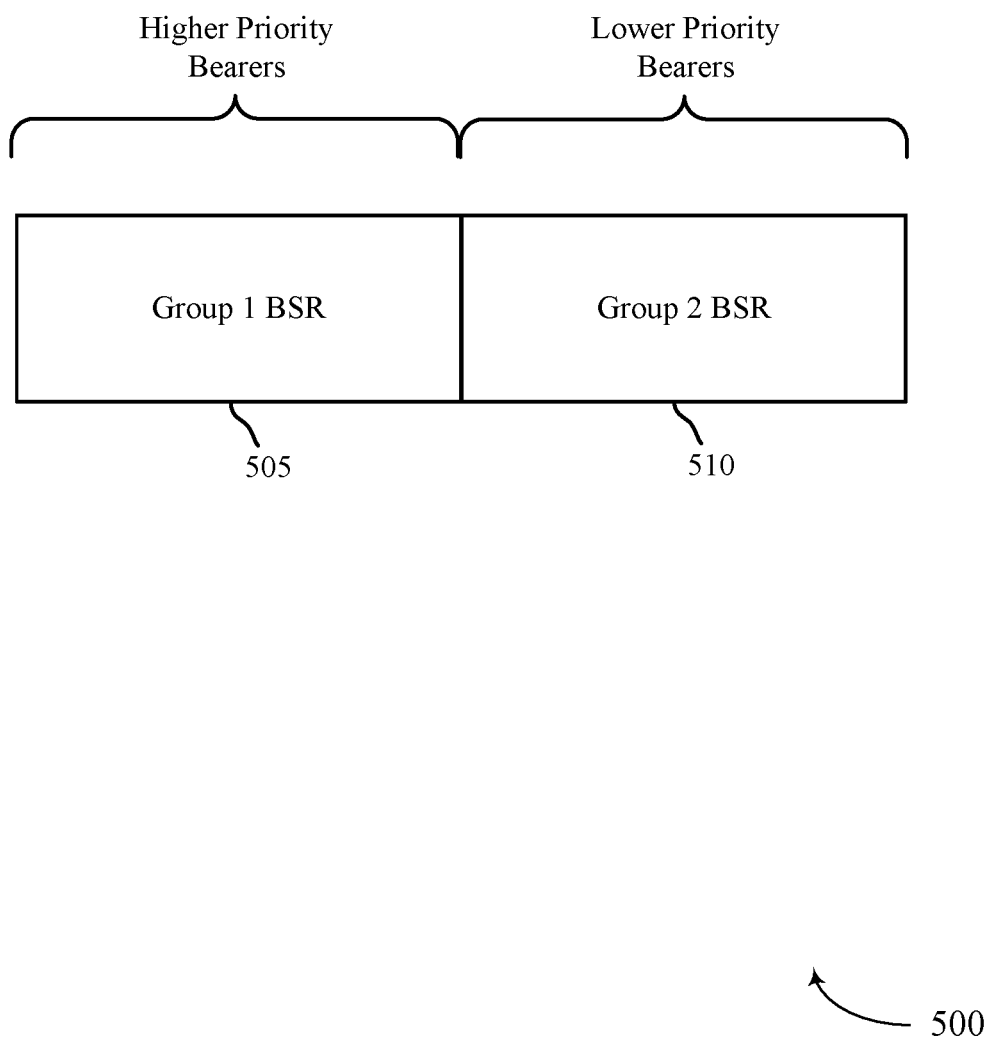
FIG. 5 illustrates an example of a buffer status report (BSR) that supports uplink data transfer for wireless communications with mixed TTIs in accordance with aspects of the present disclosure.

FIG. 5 illustrates an example of a BSR 500 for uplink data transfer for wireless communications with mixed TTIs. The techniques described with reference to FIG. 5 may be used, for example, in mixed TTI communications between a UE and a base station such as discussed above with respect to FIGS. 1 and 2. In this example, a first BSR portion 505 may include a group one BSR associated with higher priority bearers or logical channels, and a second BSR portion 510 may include a group two BSR associated with lower priority bearers or logical channels.

As indicated above, in buffer status reporting, higher priority can be given to a logical channel group in the BSR if the group can be transmitted with the TTI associated with the BSR. In some cases, however, the space for BSR in a particular uplink transmission may not always be sufficient to include the status for both the first BSR portion 505 and the second BSR portion 510. In such cases, the higher priority first BSR portion 505 may be reported.

Figure 6:
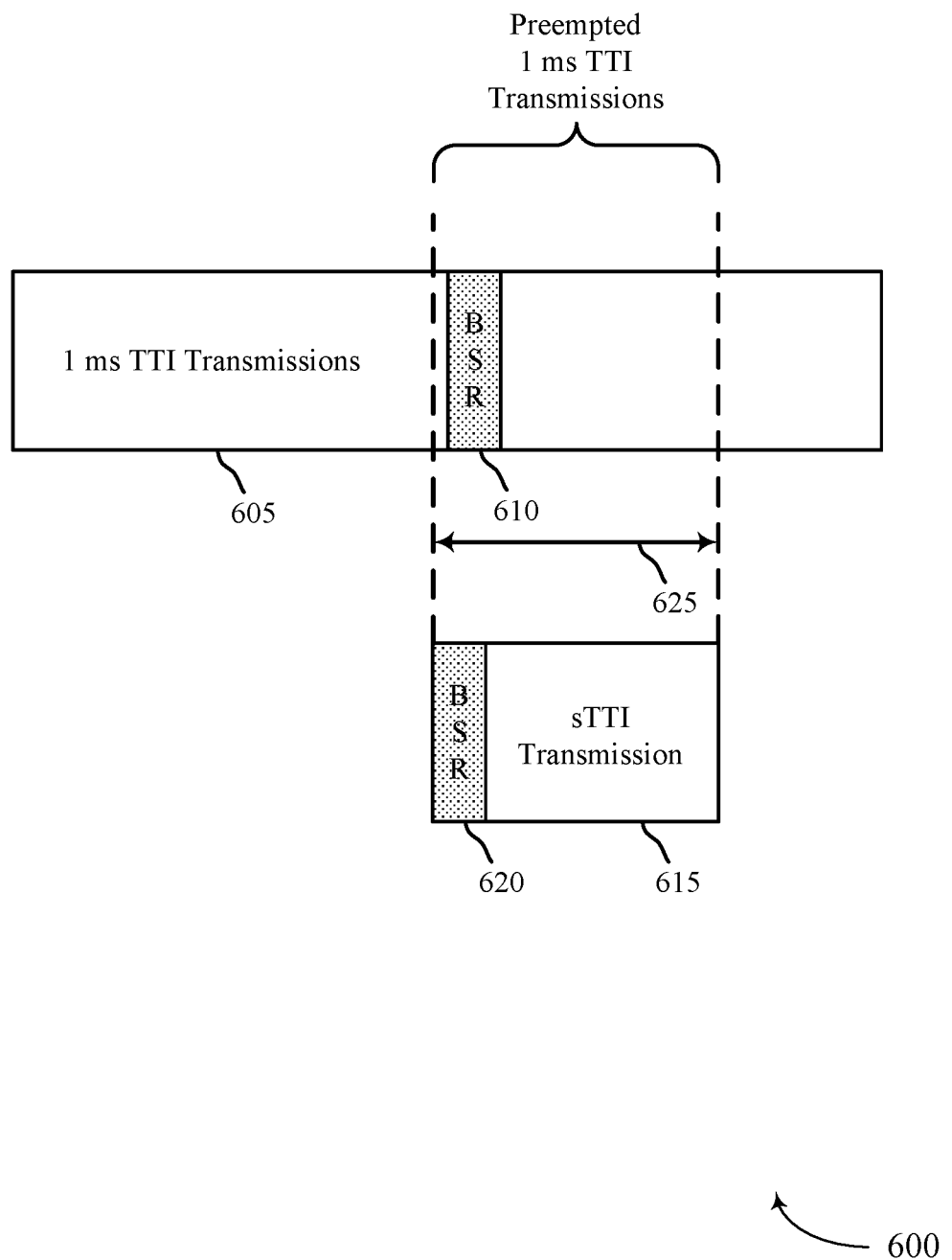
FIG. 6 illustrates an example of multiple TTI transmissions that support uplink data transfer for wireless communications with mixed TTIs in accordance with aspects of the present disclosure.

FIG. 6 illustrates an example of multiple TTI transmissions 600 for uplink data transfer for wireless communications with mixed TTIs. The techniques described with reference to FIG. 6 may be used, for example, in mixed TTI communications between a UE and a base station as discussed above with respect to FIGS. 1 and 2. In this example, a 1 ms TTI transmission 605 may be an ongoing transmission, which may be scheduled to transmit a BSR 610. This transmission may be preempted by an sTTI transmission 615, which in some cases may have resources for its own BSR 620. In this case, a portion 625 of the 1 ms TTI may be preempted.

In some cases, several options may be available to account for the intercepted portion 625 of the 1 ms TTI transmissions 605 if a BSR 620 is included in the sTTI transmission 615. In some examples, a packet size of the intercepted portion 625 may be is included in sTTI BSR 620 if the UE is not able to transmit simultaneously and thus drops the corresponding portions (e.g., portion 625) of the 1 ms TTI transmissions 605. In other examples, a packet size of the intercepted portion 625 may not be included in sTTI BSR 620 if the UE is able to transmit both the 1 ms TTI transmissions 605 and the sTTI transmission 615 simultaneously (e.g., on different component carriers). The inclusion, or not, of the packet size of the intercepted portion 625 may, in some cases, be specified, or, in other cases, may be configured by RRC signaling. In yet other cases, a UE may always send a BSR 620 in the sTTI transmission 615. In some examples, where carrier aggregation may support multiple component carriers, when a logical channel can be transmitted either on an sTTI on one component carrier and on a 1 ms TTI on another component carrier, a UE may give priority to either the sTTI or 1 ms TTI for the logical channel. In other examples, the priority for such logical channels may be configurable by the base station or may be specified.

Figure 7:
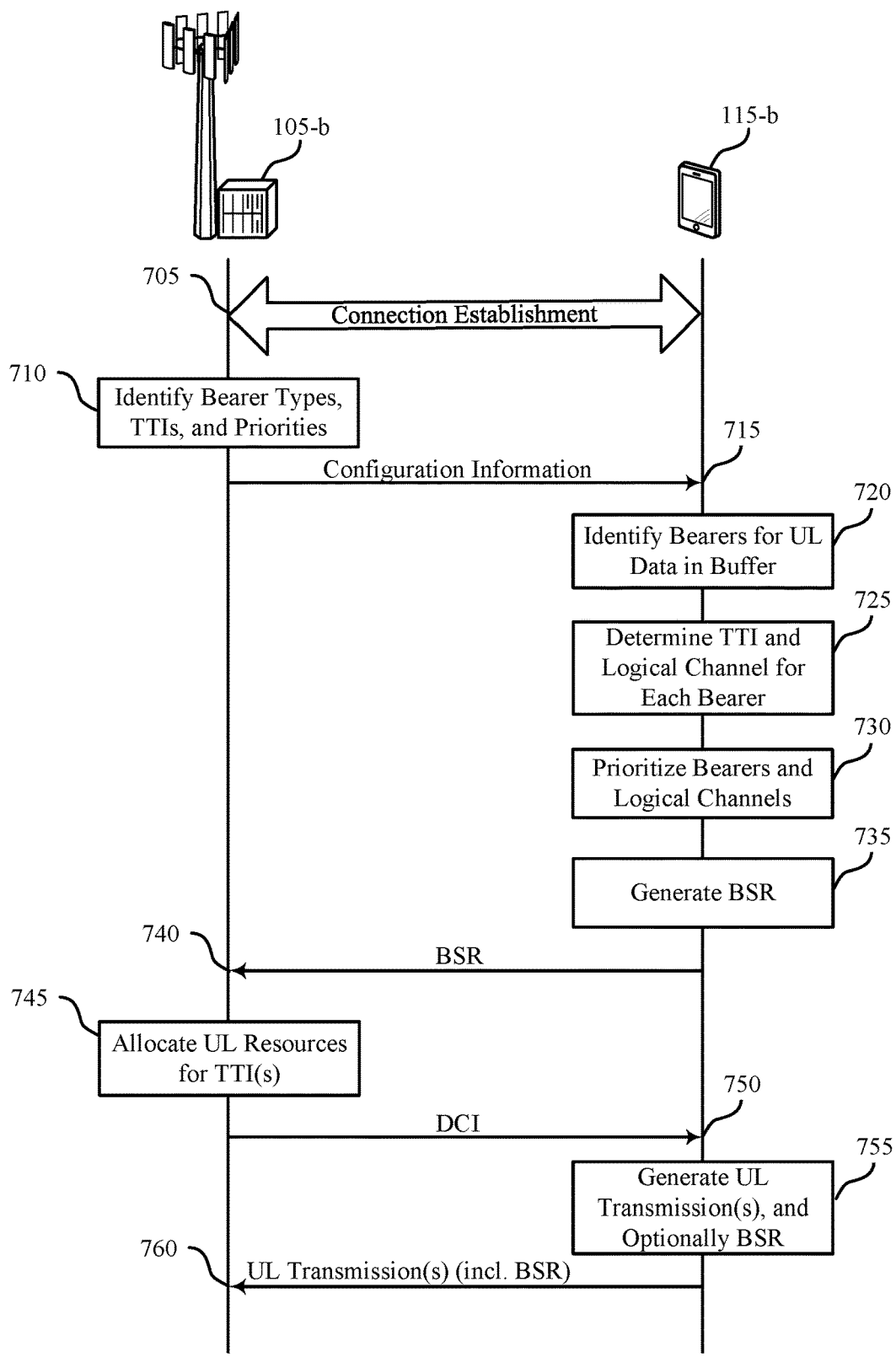
FIG. 7 illustrates an example of a process flow that supports uplink data transfer for wireless communications with mixed TTIs in accordance with aspects of the present disclosure.

FIG. 7 illustrates an example of a process flow 700 for uplink data transfer for wireless communications with mixed TTIs. Process flow 700 may include a base station 105-*b*, and a UE 115-*b*, which may be examples of the corresponding devices described with reference to FIGS. 1-6. The base station 105-*b* and the UE 115-*b* may establish a connection 705 according to connection establishment techniques for the wireless communications system.

At block 710, the base station 105-*b* may identify bearer types, TTI durations, and priorities for different bearers based on services to be provided. For example, a URLLC service may be configured with an sTTI, and a bearer type for this service may be prioritized ahead of any other service. The base station 105-*b* may transmit the configuration information 715 to the UE 115-*b*, in this example. In some cases, the configuration information may be provided through RRC signaling, for example.

At block 720, the UE 115-*b* also may identify bearers for uplink data that is to be transmitted. Such a bearer identification may be made, for example, based on a service to be provided using the bearers, as discussed above. In some cases, two or more bearers for uplink data transmission may be identified, each bearer having a bearer type.

At block 725, the UE 115-*b* may determine a TTI and logical channel for each bearer. In some cases, one TTI duration may be associated with some bearers, and two or more different TTI durations may be associated with some bearers which may indicate that such bearers may be transmitted using either TTI duration.

At block 730, the UE 115-*b* may prioritize the bearers and logical channels. In some cases, this prioritization may be based at least in part on the associated TTI duration(s), the bearer type, or any combination thereof.

The UE 115-*b* may, at block 735, generate a BSR. Such a BSR may include, as discussed above, different portions that may be used to provide BSR information for different priority bearers or logical channel groups. In some cases, a first portion of the BSR having higher priority may be transmitted ahead of a second portion of the BSR. The UE 115-*b* may transmit the BSR 740 to the base station 105-*b*.

At block 745, the base station 105-*b* may allocate uplink resources for one or more TTIs based on the BSR. For example, one or more sTTIs may be allocated if the BSR indicates uplink data is present that is to be transmitted using sTTIs. One or more 1 ms TTIs may be allocated if the BSR indicates uplink data is present that is to be transmitted using 1 ms TTIs. The base station 105-*b* may format the uplink allocation into downlink control information (DCI) 750 that is transmitted to the UE 115-*b*.

At block 755, the UE 115-*b* may generate uplink transmissions, and, in some cases, another BSR, and may transmit the uplink transmissions 760 to the base station 105-*b*. The uplink transmissions 760 may be transmitted using one or more sTTIs, or one or more 1 ms TTIs, based at least in part on the allocated uplink resources provided by the base station 105-*b*. In some cases, if the uplink transmissions 760 include an sTTI that preempts a 1 ms TTI, the sTTI may include a BSR that may include an indication of a packet size of the preempted 1 ms TTI data, as discussed above. The base station 105-*b* may receive the uplink transmissions and perform received signal processing to demodulate and decode the transmissions, and, in some cases, generate acknowledgment feedback.

Figure 8:
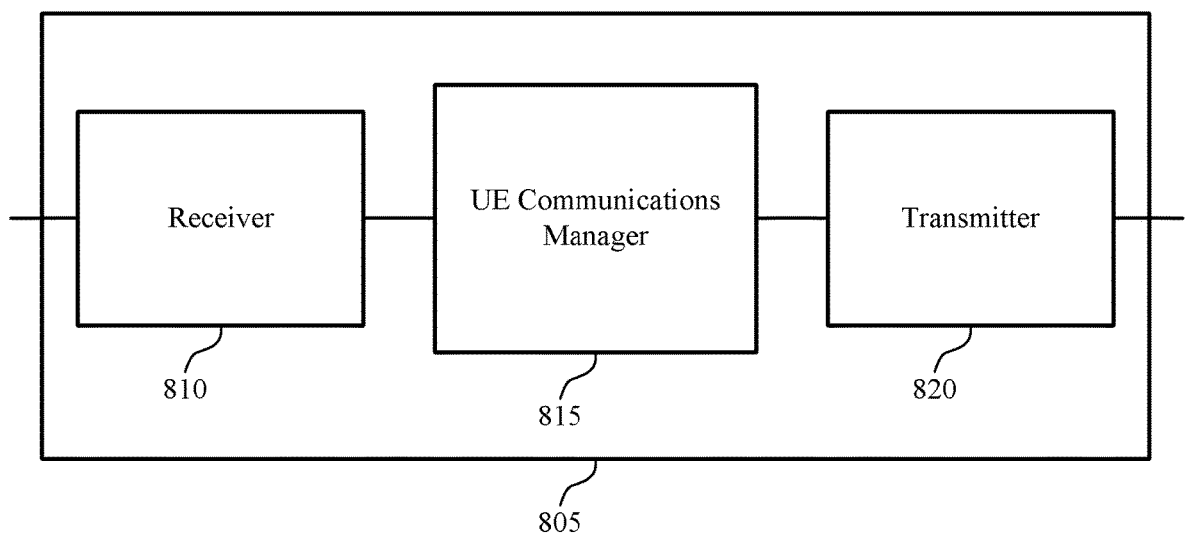
FIGS. 8-10 show block diagrams of a device that supports uplink data transfer for wireless communications with mixed TTIs in accordance with aspects of the present disclosure.

FIG. 8 shows a block diagram 800 of a wireless device 805 that supports uplink data transfer for wireless communications with mixed TTIs in accordance with various aspects of the present disclosure. Wireless device 805 may be an example of aspects of a UE 115 as described with reference to FIG. 1. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to uplink data transfer for wireless communications with mixed TTIs, etc.). Information may be passed on to other components of the device. The receiver 810 may be an example of aspects of the transceiver 1135 described with reference to FIG. 11.

UE communications manager 815 may be an example of aspects of the UE communications manager 1115 described with reference to FIG. 11. UE communications manager 815 may identify two or more bearers for an uplink data transmission from a UE to a base station, each bearer having a bearer type, associate one or more different TTI durations with each of the two or more bearers, and prioritize each bearer of the two or more bearers based on the associated one or more TTI durations or the bearer type.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas. Transmitter 820 may transmit the uplink data transmission during an uplink TTI based on the prioritization.

Figure 9:
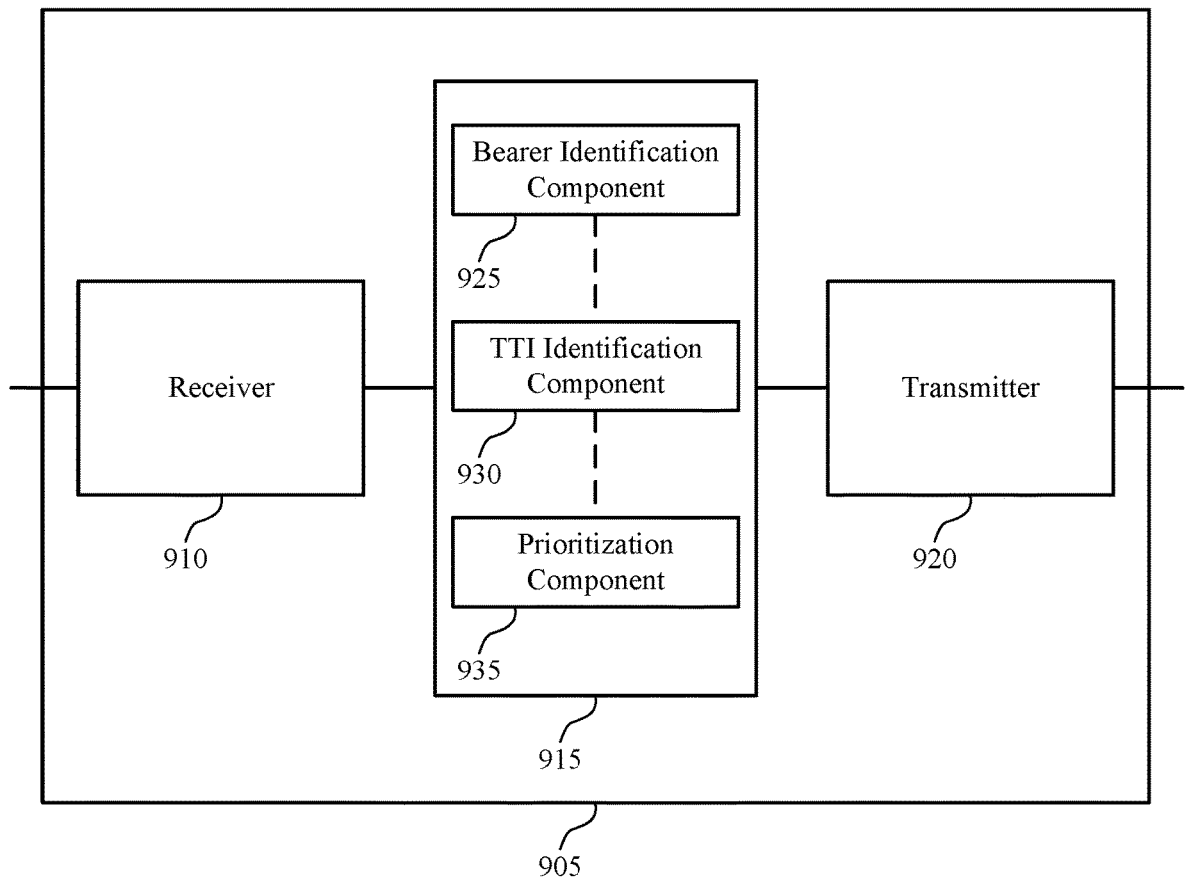

FIG. 9 shows a block diagram 900 of a wireless device 905 that supports uplink data transfer for wireless communications with mixed TTIs in accordance with various aspects of the present disclosure. Wireless device 905 may be an example of aspects of a wireless device 805 or a UE 115 as described with reference to FIGS. 1 and 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to uplink data transfer for wireless communications with mixed TTIs, etc.). Information may be passed on to other components of the device. The receiver 910 may be an example of aspects of the transceiver 1135 described with reference to FIG. 11.

UE communications manager 915 may be an example of aspects of the UE communications manager 1115 described with reference to FIG. 11. UE communications manager 915 may also include bearer identification component 925, TTI identification component 930, and prioritization component 935. Bearer identification component 925 may identify two or more bearers for an uplink data transmission from a UE to a base station, each bearer having a bearer type.

TTI identification component 930 may associate one or more different TTI durations with each of the two or more bearers. In some cases, TTI identification component 930 may associate one or more different numerologies with each of the two or more bearers. In some cases, TTI identification component 930 may determine that a second transmission of a second bearer type having a second TTI is to puncture an ongoing first transmission of a first bearer type having a first TTI that is longer than the second TTI. In some cases, TTI identification component 930 may determine that a second transmission of a second bearer type having a second TTI is to be transmitted concurrently with an ongoing first transmission of a first bearer type having a first TTI that is longer than the second TTI.

Prioritization component 935 may prioritize each bearer of the two or more bearers based on the associated one or more TTI durations or the bearer type. In some cases, prioritization component 935 may prioritize each bearer of the two or more bearers based on the associated one or more numerologies. In some cases, prioritization component 935 may prioritize identified logical channels based on the associated one or more TTI durations or the bearer type for each of the two or more bearers. In some cases, the two or more bearers include a first bearer having a first bearer type and a second bearer having a second bearer type, and where a priority of the first bearer type and the second bearer type is determined independently for each uplink TTI. In some cases, the prioritizing each bearer further includes identifying a first bearer having a first bearer type with a first bearer priority, the first bearer having a first TTI duration, identifying a second bearer having a second bearer type with a second bearer priority that is lower than the first bearer priority, the second bearer having a second TTI duration that is shorter than the first TTI duration, and prioritizing the second bearer to have a higher priority than the first bearer based on the second TTI duration.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
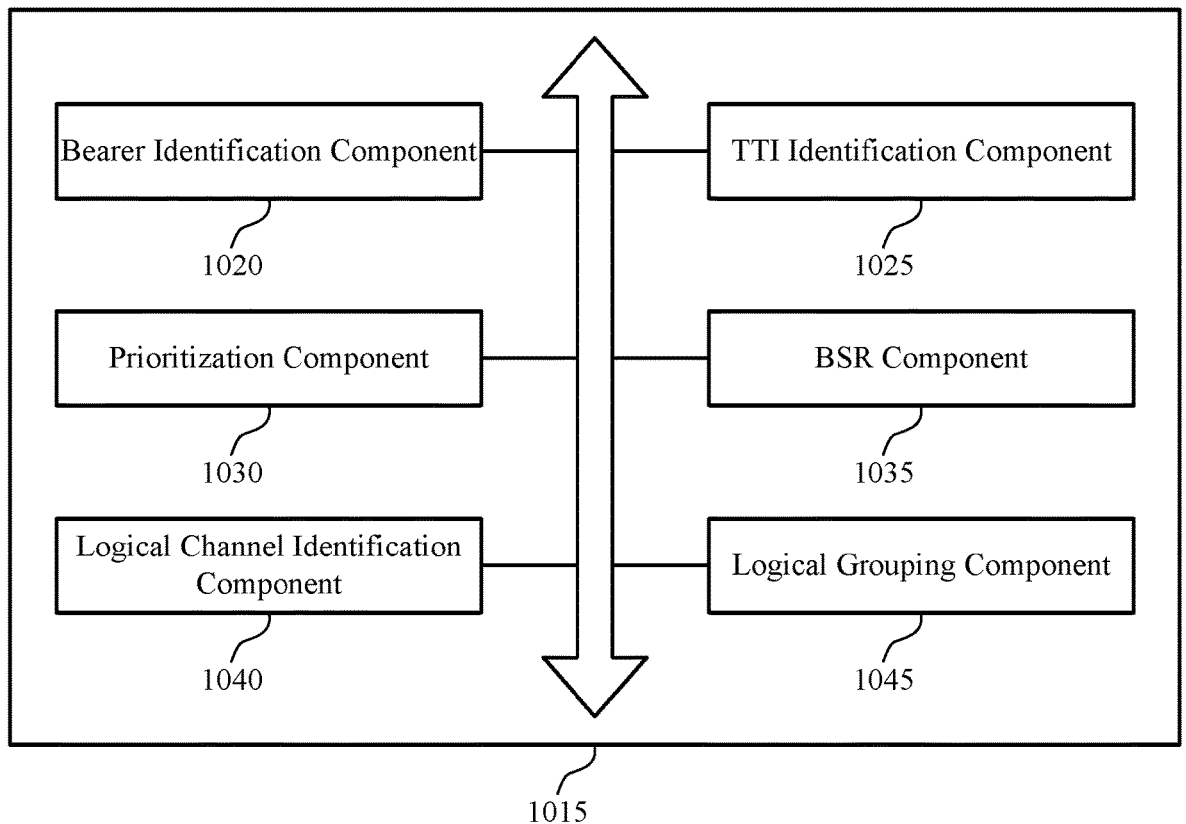

FIG. 10 shows a block diagram 1000 of a UE communications manager 1015 that supports uplink data transfer for wireless communications with mixed TTIs in accordance with various aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include bearer identification component 1020, TTI identification component 1025, prioritization component 1030, BSR component 1035, logical channel identification component 1040, and logical grouping component 1045. Each of these modules may communicate, directly or indirectly, with one another (e.g., via one or more buses).

Bearer identification component 1020 may identify two or more bearers for an uplink data transmission from a UE to a base station, each bearer having a bearer type. TTI identification component 1025 may associate one or more different TTI durations with each of the two or more bearers. In some cases, TTI identification component 1025 may associate one or more different numerologies with each of the two or more bearers. In some cases, TTI identification component 1025 may determine that a second transmission of a second bearer type having a second TTI is to puncture an ongoing first transmission of a first bearer type having a first TTI that is longer than the second TTI. In some cases, TTI identification component 1025 may determine that a second transmission of a second bearer type having a second TTI is to be transmitted concurrently with an ongoing first transmission of a first bearer type having a first TTI that is longer than the second TTI.

Prioritization component 1030 may prioritize each bearer of the two or more bearers based on the associated one or more TTI durations or the bearer type. In some cases, prioritization component 1030 may prioritize each bearer of the two or more bearers based on the associated one or more numerologies. In some cases, prioritization component 1030 may prioritize the identified logical channels based on the associated one or more TTI durations or the bearer type for each of the two or more bearers. In some cases, the two or more bearers include a first bearer having a first bearer type and a second bearer having a second bearer type, and where a priority of the first bearer type and the second bearer type is determined independently for each uplink TTI. In some cases, the prioritizing each bearer further includes identifying a first bearer having a first bearer type with a first bearer priority, the first bearer having a first TTI duration, identifying a second bearer having a second bearer type with a second bearer priority that is lower than the first bearer priority, the second bearer having a second TTI duration that is shorter than the first TTI duration, and prioritizing the second bearer to have a higher priority than the first bearer based on the second TTI duration.

BSR component 1035 may transmit a BSR associated with at least one of the two or more bearers based on the prioritization. In some cases, it may be determined that resources for transmitting the BSR are insufficient to transmit both the first portion of the BSR and the second portion of the BSR, and transmission of the second portion of the BSR may be deferred. In some cases, buffer information associated with an ongoing first transmission of the first bearer type may be included in the BSR. In some cases, the BSR may be transmitted in the second shorter TTI transmission, or buffer information associated with the ongoing first transmission of the first bearer type may be excluded from the BSR. In some cases, BSR component 1035 may determine whether to include or exclude buffer information associated with the ongoing first transmission of the first bearer type in the BSR based on a specified configuration or a configuration received in RRC signaling. In some cases, the transmitting the BSR further includes configuring a first portion of the BSR with buffer information associated one or more higher priority bearers, configuring a second portion of the BSR with buffer information associated with one or more lower priority bearers, and transmitting the first portion of the BSR ahead of the second portion of the BSR.

Logical channel identification component 1040 may identify one or more logical channels for each of the two or more bearers. Logical grouping component 1045 may logically group the two or more bearers into one or more logical groups based on TTI duration or numerology of each bearer, and transmitting a BSR associated with at least one of the one or more logical groups.

Figure 11:
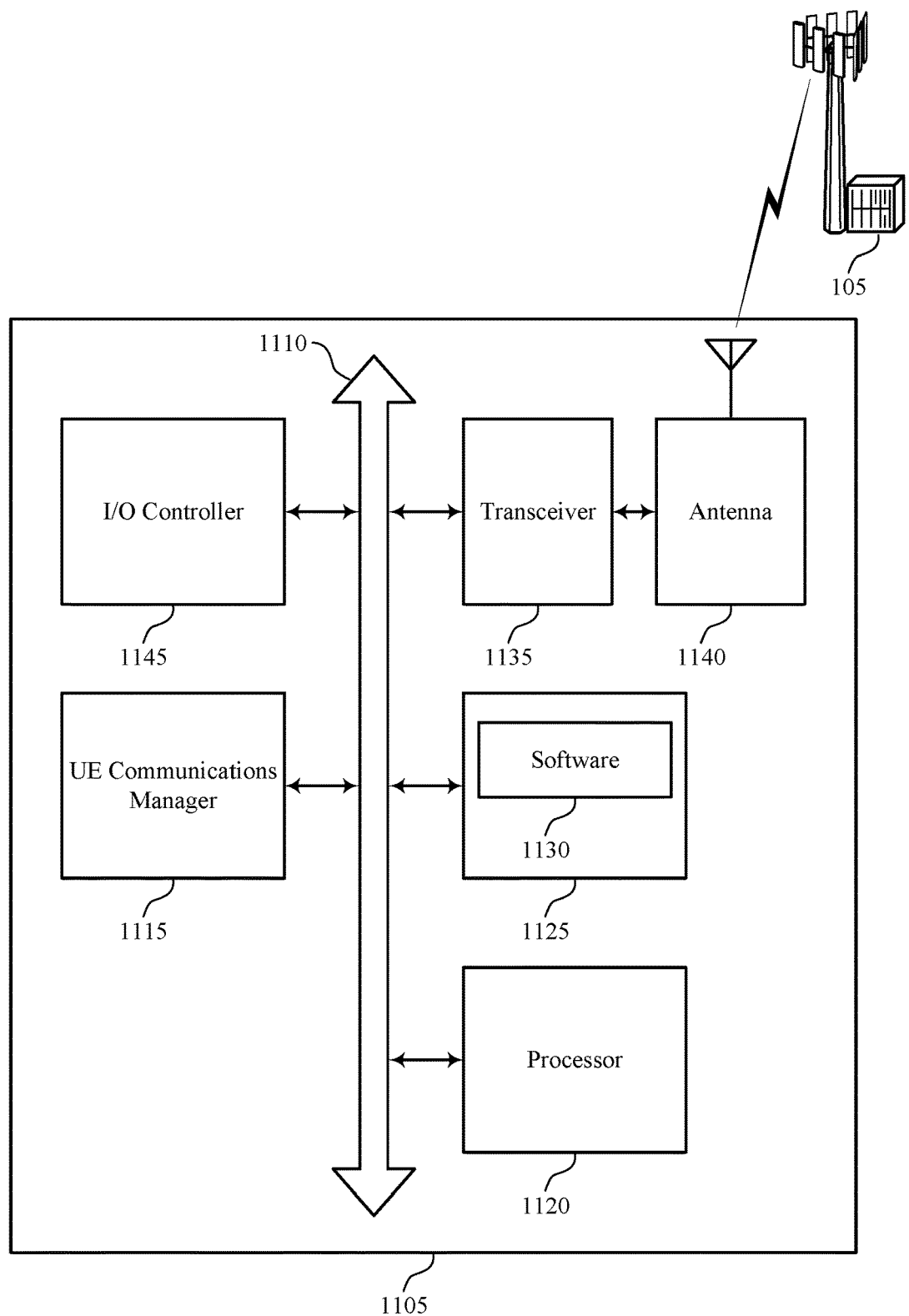
FIG. 11 illustrates a block diagram of a system including a user equipment (UE) that supports uplink data transfer for wireless communications with mixed TTIs in accordance with aspects of the present disclosure.

FIG. 11 shows a diagram of a system 1100 including a device 1105 that supports uplink data transfer for wireless communications with mixed TTIs in accordance with various aspects of the present disclosure. Device 1105 may be an example of or include the components of wireless device 805, wireless device 905, or a UE 115 as described above, e.g., with reference to FIGS. 1, 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting uplink data transfer for wireless communications with mixed TTIs).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support uplink data transfer for wireless communications with mixed TTIs. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system.

Figure 12:
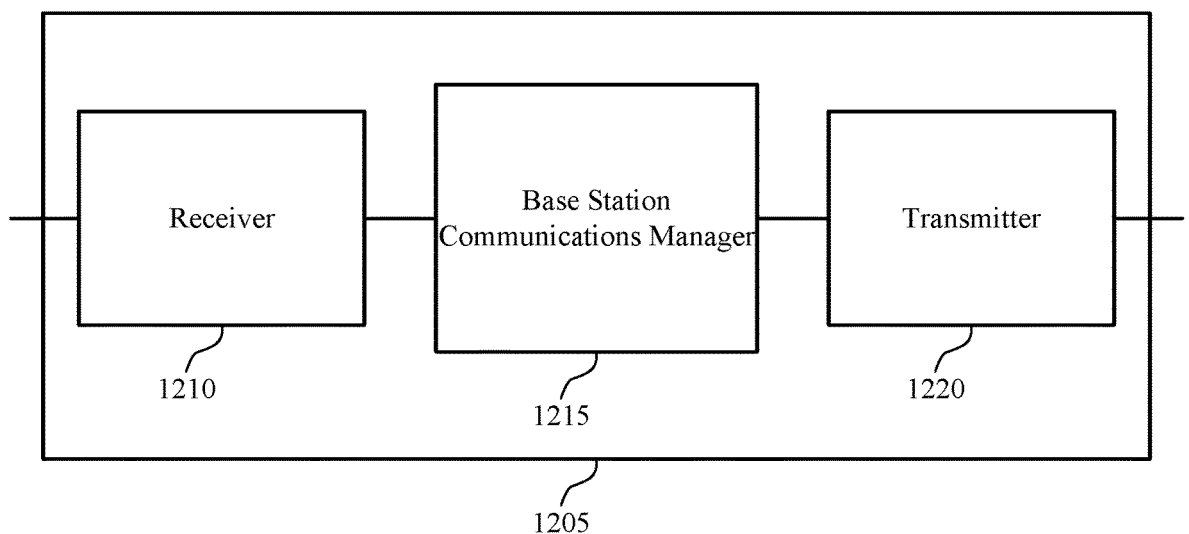
FIGS. 12-14 show block diagrams of a device that supports uplink data transfer for wireless communications with mixed TTIs in accordance with aspects of the present disclosure.

FIG. 12 shows a block diagram 1200 of a wireless device 1205 that supports uplink data transfer for wireless communications with mixed TTIs in accordance with various aspects of the present disclosure. Wireless device 1205 may be an example of aspects of a base station 105 as described with reference to FIG. 1. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to uplink data transfer for wireless communications with mixed TTIs, etc.). Information may be passed on to other components of the device. The receiver 1210 may be an example of aspects of the transceiver 1535 described with reference to FIG. 15.

Base station communications manager 1215 may be an example of aspects of the base station communications manager 1515 described with reference to FIG. 15. Base station communications manager 1215 may identify two or more bearer types for uplink data transmissions from a UE, associate one or more different TTI durations with each of the two or more bearers types, prioritize each bearer type of the two or more bearer types based on the associated one or more TTI durations, and configure the UE to transmit an uplink transmission during an uplink TTI based on the prioritization.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
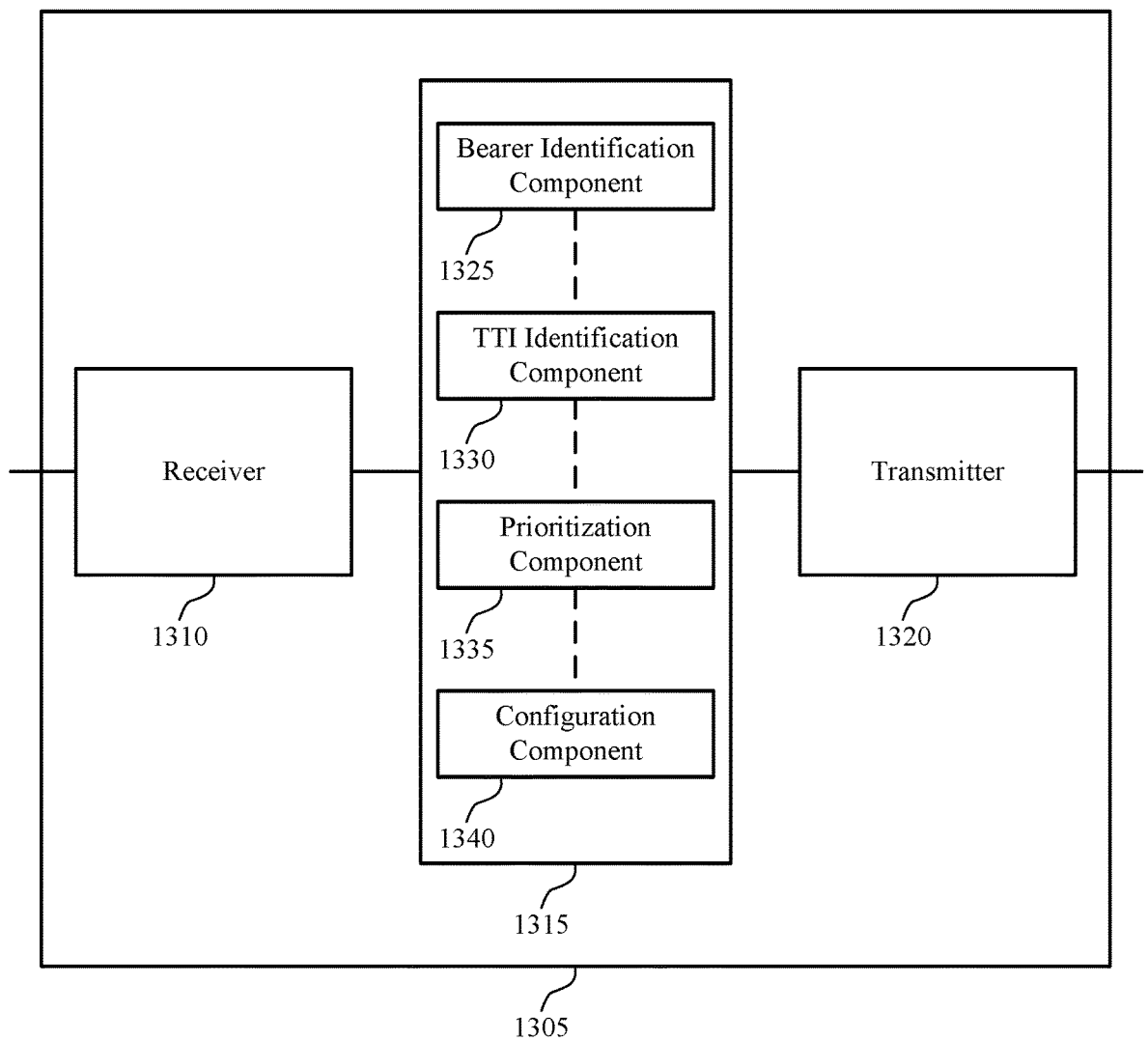

FIG. 13 shows a block diagram 1300 of a wireless device 1305 that supports uplink data transfer for wireless communications with mixed TTIs in accordance with various aspects of the present disclosure. Wireless device 1305 may be an example of aspects of a wireless device 1205 or a base station 105 as described with reference to FIGS. 1 and 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to uplink data transfer for wireless communications with mixed TTIs, etc.). Information may be passed on to other components of the device. The receiver 1310 may be an example of aspects of the transceiver 1535 described with reference to FIG. 15.

Base station communications manager 1315 may be an example of aspects of the base station communications manager 1515 described with reference to FIG. 15. Base station communications manager 1315 may also include bearer identification component 1325, TTI identification component 1330, prioritization component 1335, and configuration component 1340.

Bearer identification component 1325 may identify two or more bearer types for uplink data transmissions from a UE. TTI identification component 1330 may associate one or more different TTI durations with each of the two or more bearers types. In some cases, TTI identification component 1330 may associate one or more different numerologies with each of the two or more bearer types. Prioritization component 1335 may prioritize each bearer type of the two or more bearer types based on the associated one or more TTI durations. In some cases, prioritization component 1335 may prioritize each bearer type of the two or more bearer types based on the associated one or more numerologies. In some cases, prioritization component 1335 may logically group the two or more bearer types into one or more logical groups based on the TTI duration or numerology of each bearer type. In some cases, a priority of the two or more bearer types is determined independently for each logical group of the one or more logical groups. In some cases, the prioritizing each bearer type further includes identifying a first bearer type with a first bearer priority, and identifying a second bearer type with a second bearer priority that is lower than the first bearer priority.

Configuration component 1340 may configure the UE to transmit an uplink transmission during an uplink TTI based on the prioritization. Configuration component 1340 may also configure the UE to transmit a BSR based on the prioritized bearer types, configure the UE to transmit a BSR associated with each of the one or more logical groups, and configure the UE to include buffer information in the BSR associated with an ongoing first transmission of a first bearer type based on whether a second transmission punctures the ongoing first transmission or is transmitted concurrently with the ongoing first transmission. In some cases, the UE may be configured to prioritize the second bearer type to have a higher priority than the first bearer type when the second bearer type is to be transmitted using a shorter duration TTI than the first bearer type, and to prioritize the first bearer type to have a higher priority than the second bearer type when the first bearer type is to be transmitted using a shorter duration TTI than, or a same duration TTI as, the second bearer type. In some cases, configuring the UE to transmit the BSR is performed through RRC signaling transmitted to the UE.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
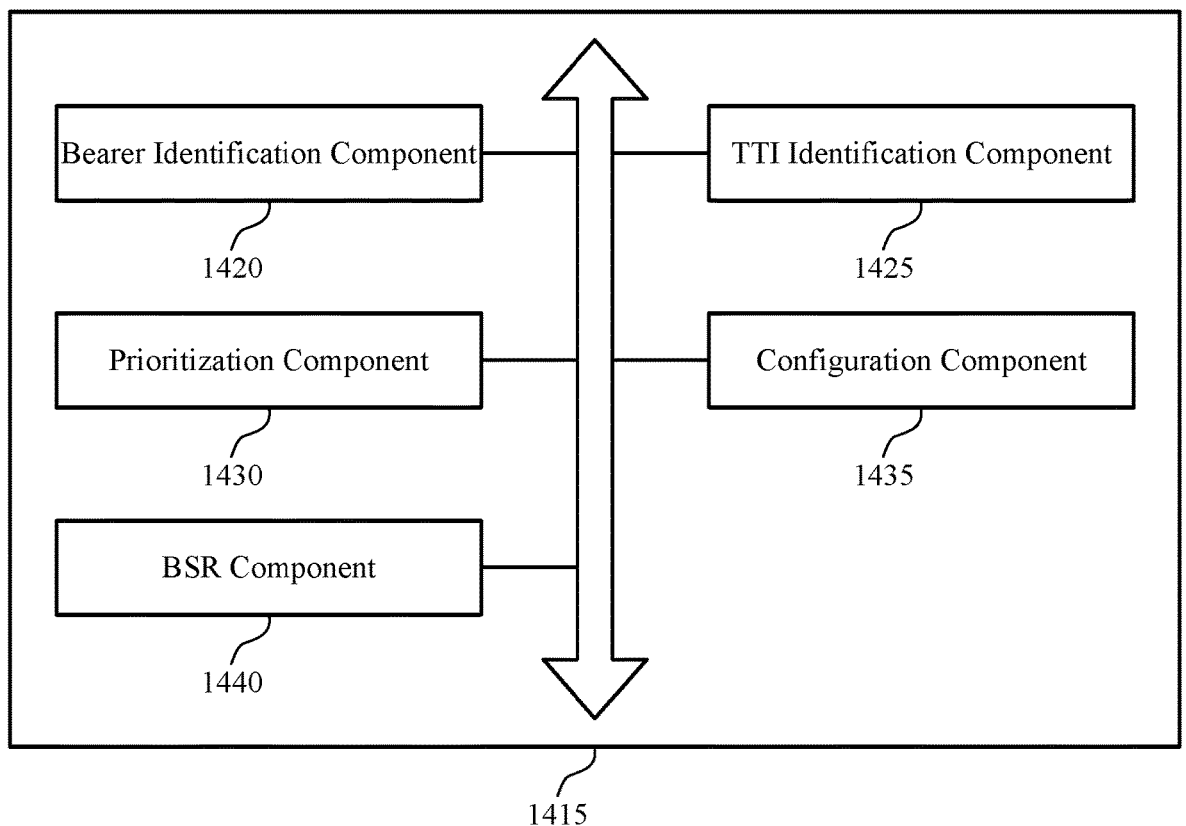

FIG. 14 shows a block diagram 1400 of a base station communications manager 1415 that supports uplink data transfer for wireless communications with mixed TTIs in accordance with various aspects of the present disclosure. The base station communications manager 1415 may be an example of aspects of a base station communications manager 1515 described with reference to FIGS. 12, 13, and 15. The base station communications manager 1415 may include bearer identification component 1420, TTI identification component 1425, prioritization component 1430, configuration component 1435, and BSR component 1440. Each of these modules may communicate, directly or indirectly, with one another (e.g., via one or more buses).

Bearer identification component 1420 may identify two or more bearer types for uplink data transmissions from a UE. TTI identification component 1425 may associate one or more different TTI durations with each of the two or more bearers types. In some cases, TTI identification component 1425 may associate one or more different numerologies with each of the two or more bearer types. Prioritization component 1430 may prioritize each bearer type of the two or more bearer types based on the associated one or more TTI durations. In some cases, prioritization component 1430 may prioritize each bearer type of the two or more bearer types based at least in part on the associated one or more numerologies. In some cases, prioritization component 1430 may logically group the two or more bearer types into one or more logical groups based on the TTI duration or numerology of each bearer type. In some cases, a priority of the two or more bearer types is determined independently for each logical group of the one or more logical groups. In some cases, the prioritizing each bearer type further includes identifying a first bearer type with a first bearer priority, and identifying a second bearer type with a second bearer priority that is lower than the first bearer priority.

Configuration component 1435 may configure the UE to transmit an uplink transmission during an uplink TTI based on the prioritization. Configuration component 1435 also may configure the UE to transmit a BSR based on the prioritized bearer types, configure the UE to transmit a BSR associated with each of the one or more logical groups, and configure the UE to include buffer information in the BSR associated with an ongoing first transmission of a first bearer type based on whether a second transmission punctures the ongoing first transmission or is transmitted concurrently with the ongoing first transmission. In some cases, the UE may be configured to prioritize the second bearer type to have a higher priority than the first bearer type when the second bearer type is to be transmitted using a shorter duration TTI than the first bearer type, and to prioritize the first bearer type to have a higher priority than the second bearer type when the first bearer type is to be transmitted using a shorter duration TTI than, or a same duration TTI as, the second bearer type. In some cases, configuring the UE to transmit the BSR is performed through RRC signaling transmitted to the UE.

BSR component 1440 may configure the UE to transmit a first portion of a BSR with buffer information associated with one or more higher priority bearer types ahead of a second portion of the BSR with buffer information associated with one or more lower priority bearer types.

Figure 15:
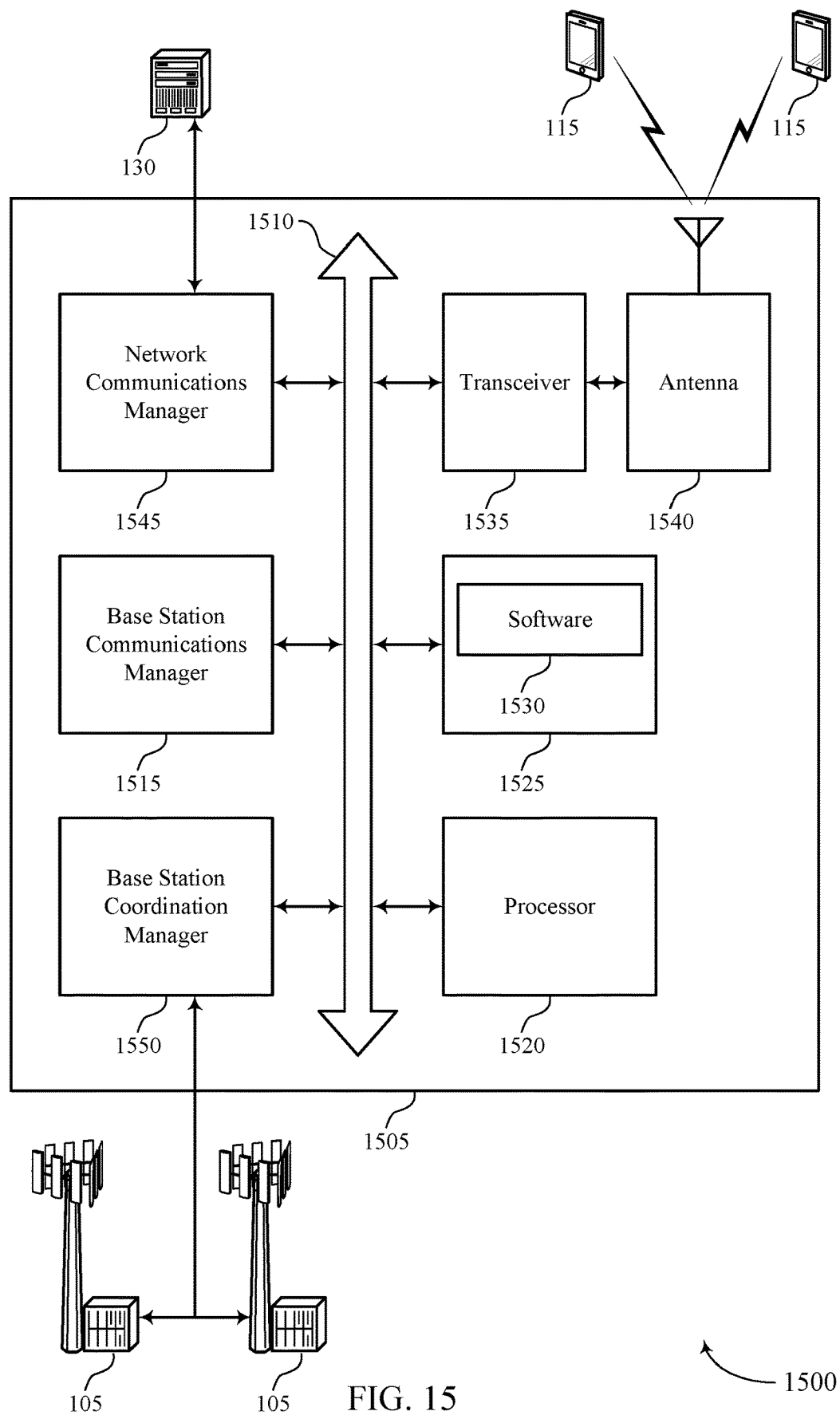
FIG. 15 illustrates a block diagram of a system including a base station that supports uplink data transfer for wireless communications with mixed TTIs in accordance with aspects of the present disclosure.

FIG. 15 shows a diagram of a system 1500 including a device 1505 that supports uplink data transfer for wireless communications with mixed TTIs in accordance with various aspects of the present disclosure. Device 1505 may be an example of or include the components of base station 105 as described above, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and base station coordination manager 1550. These components may be in electronic communication via one or more busses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting uplink data transfer for wireless communications with mixed transmission time intervals).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support uplink data transfer for wireless communications with mixed TTIs. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Base station coordination manager 1550 may manage communications with other base station 105, and may include a controller or scheduler for controlling communications with UEs 115 in cooperation with other base stations 105. For example, the base station coordination manager 1550 may coordinate scheduling for transmissions to UEs 115 for various interference mitigation techniques such as beamforming or joint transmission. In some examples, base station coordination manager 1550 may provide an X2 interface within an LTE/LTE-A wireless communication network technology to provide communication between base stations 105.

Figure 16:
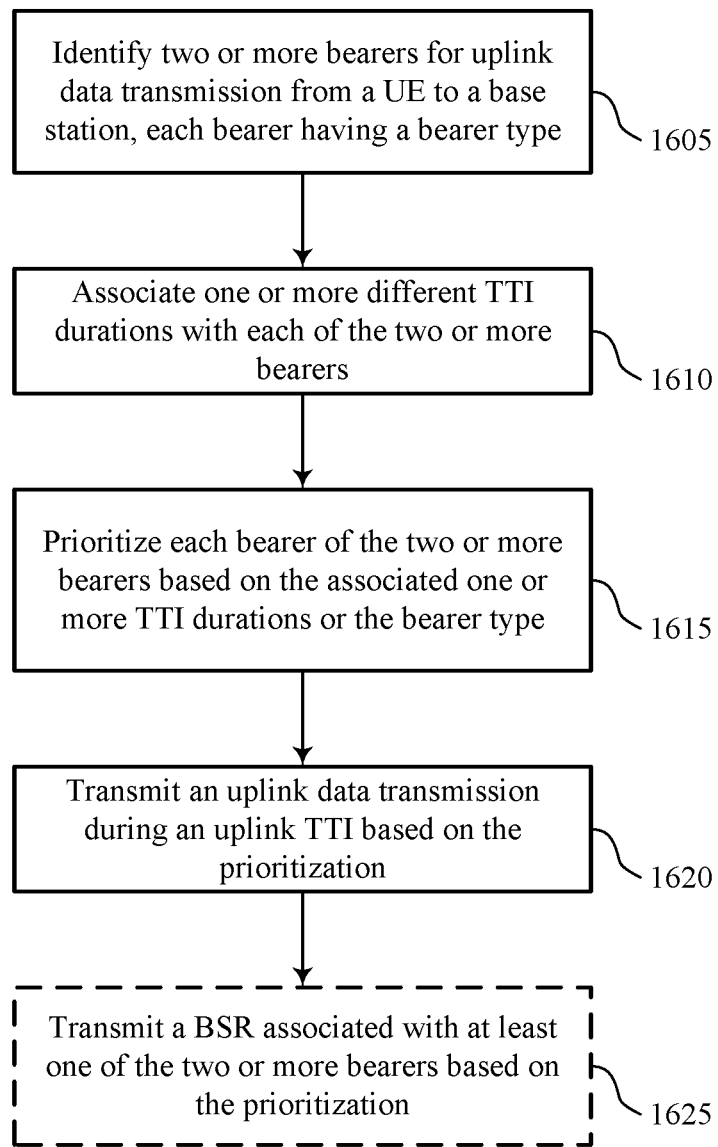
FIGS. 16-18 illustrate methods for uplink data transfer for wireless communications with mixed TTIs in accordance with aspects of the present disclosure.

FIG. 16 shows a flowchart illustrating a method 1600 for uplink data transfer for wireless communications with mixed TTIs in accordance with various aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects the functions described below using special-purpose hardware.

At block 1605 the UE 115 may identify two or more bearers for an uplink data transmission from a UE to a base station, each bearer having a bearer type. The operations of block 1605 may be performed according to the methods described with reference to FIGS. 1 through 7. In certain examples, aspects of the operations of block 1605 may be performed by a bearer identification component as described with reference to FIGS. 8 through 11.

At block 1610 the UE 115 may associate one or more different TTI durations with each of the two or more bearers. The operations of block 1610 may be performed according to the methods described with reference to FIGS. 1 through 7. In certain examples, aspects of the operations of block 1610 may be performed by a TTI identification component as described with reference to FIGS. 8 through 11.

At block 1615 the UE 115 may prioritize each bearer of the two or more bearers based at least in part on the associated one or more TTI durations or the bearer type. The operations of block 1615 may be performed according to the methods described with reference to FIGS. 1 through 7. In certain examples, aspects of the operations of block 1615 may be performed by a prioritization component as described with reference to FIGS. 8 through 11.

At block 1620 the UE 115 may transmit the uplink data transmission during an uplink TTI based at least in part on the prioritization. The operations of block 1620 may be performed according to the methods described with reference to FIGS. 1 through 7. In certain examples, aspects of the operations of block 1620 may be performed by a transmitter as described with reference to FIGS. 8 through 11.

At optional block 1625 the UE 115 may transmit a BSR associated with at least one of the two or more bearers based at least in part on the prioritization. The operations of block 1625 may be performed according to the methods described with reference to FIGS. 1 through 7. In certain examples, aspects of the operations of block 1625 may be performed by a BSR component as described with reference to FIGS. 8 through 11.

Figure 17:
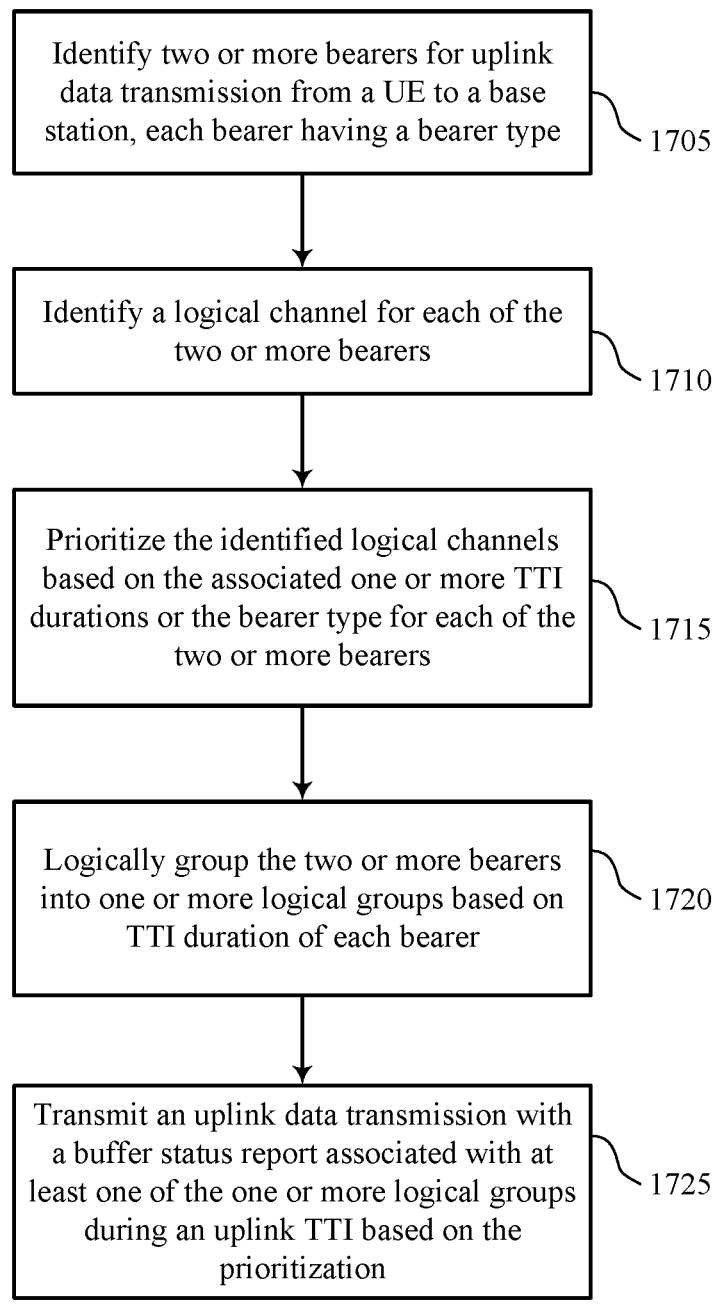

FIG. 17 shows a flowchart illustrating a method 1700 for uplink data transfer for wireless communications with mixed TTIs in accordance with various aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects the functions described below using special-purpose hardware.

At block 1705 the UE 115 may identify two or more bearers for an uplink data transmission from a UE to a base station, each bearer having a bearer type. The operations of block 1705 may be performed according to the methods described with reference to FIGS. 1 through 7. In certain examples, aspects of the operations of block 1705 may be performed by a bearer identification component as described with reference to FIGS. 8 through 11.

At block 1710 the UE 115 may identify one or more logical channels for each of the two or more bearers. The operations of block 1710 may be performed according to the methods described with reference to FIGS. 1 through 7. In certain examples, aspects of the operations of block 1710 may be performed by a logical channel identification component as described with reference to FIGS. 8 through 11.

At block 1715 the UE 115 may prioritize the identified logical channels based at least in part on the associated one or more TTI durations or the bearer type for each of the two or more bearers. The operations of block 1715 may be performed according to the methods described with reference to FIGS. 1 through 7. In certain examples, aspects of the operations of block 1715 may be performed by a prioritization component as described with reference to FIGS. 8 through 11.

At block 1720 the UE 115 may logically group the two or more bearers into one or more logical groups based at least in part on TTI duration of each bearer. The operations of block 1720 may be performed according to the methods described with reference to FIGS. 1 through 7. In certain examples, aspects of the operations of block 1720 may be performed by a logical grouping component as described with reference to FIGS. 8 through 11.

At block 1725 the UE 115 may transmit the uplink data transmission with a BSR associated with at least one of the one or more logical groups during an uplink TTI based on the prioritization. The operations of block 1725 may be performed according to the methods described with reference to FIGS. 1 through 7. In certain examples, aspects of the operations of block 1725 may be performed by a transmitter as described with reference to FIGS. 8 through 11.

Figure 18:
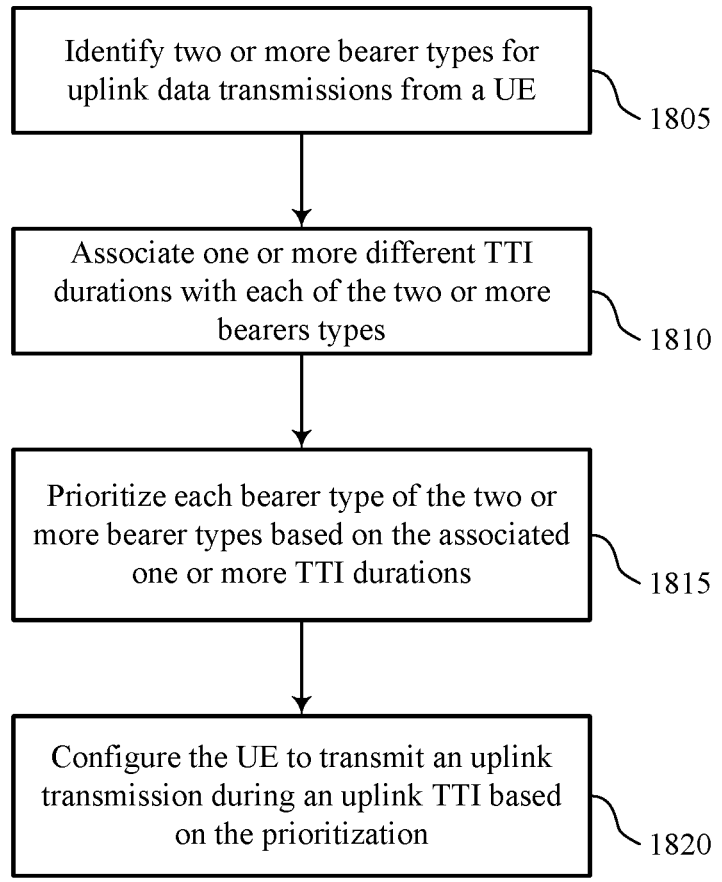

FIG. 18 shows a flowchart illustrating a method 1800 for uplink data transfer for wireless communications with mixed TTIs in accordance with various aspects of the present disclosure. The operations of method 1800 may be implemented by a base station 105 or its components as described herein. For example, the operations of method 1800 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects the functions described below using special-purpose hardware.

At block 1805 the base station 105 may identify two or more bearer types for uplink data transmissions from a UE. The operations of block 1805 may be performed according to the methods described with reference to FIGS. 1 through 7. In certain examples, aspects of the operations of block 1805 may be performed by a bearer identification component as described with reference to FIGS. 12 through 15.

At block 1810 the base station 105 may associate one or more different TTI durations with each of the two or more bearers types. The operations of block 1810 may be performed according to the methods described with reference to FIGS. 1 through 7. In certain examples, aspects of the operations of block 1810 may be performed by a TTI identification component as described with reference to FIGS. 12 through 15.

At block 1815 the base station 105 may prioritize each bearer type of the two or more bearer types based at least in part on the associated one or more TTI durations. The operations of block 1815 may be performed according to the methods described with reference to FIGS. 1 through 7. In certain examples, aspects of the operations of block 1815 may be performed by a prioritization component as described with reference to FIGS. 12 through 15.

At block 1820 the base station 105 may configure the UE to transmit an uplink transmission during an uplink TTI based at least in part on the prioritization. The operations of block 1820 may be performed according to the methods described with reference to FIGS. 1 through 7. In certain examples, aspects of the operations of block 1820 may be performed by a configuration component as described with reference to FIGS. 12 through 15.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers.

Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying two or more bearers for an uplink data transmission from a user equipment (UE) to a base station, each bearer having a bearer type;
   associating one or more different numerologies with each of the two or more bearers;
   determining a group of bearers from the two or more bearers based at least in part on a numerology of the associated one or more different numerologies;
   prioritizing each bearer within the group of bearers based at least in part on the bearer type;
   multiplexing each bearer within the group of bearers together based at least in part on the prioritization; and
   transmitting the uplink data transmission during an uplink transmission time interval (TTI) based at least in part on the multiplexing.

2. The method of claim 1, further comprising:
   associating one or more different TTI durations with each of the two or more bearers; and
   determining the group of bearers from the two or more bearers based at least in part on a TTI duration of the associated one or more different TTI durations.

3. The method of claim 2, further comprising:
   receiving an indication of the group of bearers, an indication of the TTI duration of the associated one or more different TTI durations, or a combination thereof, wherein the group of bearers is determined based at least in part on the indication of the group of bearers, maximum TTI duration indication, or combination thereof.

4. The method of claim 1, further comprising:
   transmitting a buffer status report (BSR) associated with at least one of the group of bearers based at least in part on the prioritization.

5. The method of claim 1, further comprising:
   identifying one or more logical channels for each of the bearers in the group of bearers; and
   prioritizing the identified logical channels based at least in part on the bearer type for each of the bearers in the group of bearers.

6. The method of claim 1, further comprising:
   logically grouping the two or more bearers into one or more logical groups based at least in part on a TTI duration of each bearer; and
   transmitting a buffer status report associated with at least one of the one or more logical groups.

7. The method of claim 6, wherein the two or more bearers comprise a first bearer having a first bearer type and a second bearer having a second bearer type, and wherein a priority of the first bearer type and the second bearer type is determined independently for each uplink TTI.

8. The method of claim 1, wherein the prioritizing each bearer further comprises:
   identifying a first bearer having a first bearer type with a first bearer priority, the first bearer having a first TTI duration;
   identifying a second bearer having a second bearer type with a second bearer priority that is lower than the first bearer priority, the second bearer having a second TTI duration that is shorter than the first TTI duration; and
   prioritizing the second bearer to have a higher priority than the first bearer based on the second TTI duration.

9. The method of claim 1, further comprising:
   configuring a first portion of a buffer status report (BSR) with buffer information associated with one or more higher priority bearers;
   configuring a second portion of the BSR with buffer information associated with one or more lower priority bearers; and
   transmitting the first portion of the BSR ahead of the second portion of the BSR.

10. The method of claim 9, further comprising:
    determining that resources for transmitting the BSR are insufficient to transmit both the first portion of the BSR and the second portion of the BSR; and
    deferring transmission of the second portion of the BSR.

11. The method of claim 1, further comprising:
    determining that a second transmission of a second bearer type having a second TTI is to puncture an ongoing first transmission of a first bearer type having a first TTI that is longer than the second TTI;
    including buffer information associated with the ongoing first transmission of the first bearer type in a buffer status report (BSR); and
    transmitting the BSR in the second transmission.

12. The method of claim 1, further comprising:
    determining that a second transmission of a second bearer type having a second TTI is to be transmitted concurrently with an ongoing first transmission of a first bearer type having a first TTI that is longer than the second TTI;
    excluding buffer information associated with the ongoing first transmission of the first bearer type from a buffer status report (BSR); and
    transmitting the BSR in the second transmission.

13. The method of claim 1, further comprising:
    determining that a second transmission of a second bearer type having a second TTI is to be transmitted prior to completion of an ongoing first transmission of a first bearer type having a first TTI that is longer than the second TTI; and
    determining whether to include or exclude buffer information associated with the ongoing first transmission of the first bearer type in a buffer status report (BSR) based at least in part on a specified configuration or a configuration received in radio resource control (RRC) signaling; and
    transmitting the BSR in the second transmission.

14. The method of claim 1, further comprising:
    determining that the uplink data transmission can be transmitted using a first TTI on a first component carrier or using a second TTI on a second component carrier, wherein the second TTI is longer than the first TTI; and
    selecting one of the first component carrier or the second component carrier for transmission of the uplink data transmission based at least in part on a specified or a configured prioritization for transmission of the uplink data transmission using the first TTI or the second TTI.

15. The method of claim 1, wherein the one or more different numerologies comprise a symbol size, a subcarrier size, a symbol-period duration, a TTI duration, or a combination thereof.

16. A method for wireless communication, comprising:
identifying two or more bearer types for uplink data transmissions from a user equipment (UE);
associating one or more different numerologies with each of the two or more bearer types;
determining a group of bearers from the two or more bearer types based at least in part on a numerology of the associated one or more different numerologies;
prioritizing each bearer type within the group of bearers based at least in part on the associated one or more different numerologies; and
configuring the UE to transmit an uplink transmission during an uplink transmission time interval (TTI) based at least in part on the prioritization.

17. The method of claim 16, further comprising:
associating one or more different TTI durations with each of the two or more bearers;
determining the group of bearers from the two or more bearer types based at least in part on a TTI duration of the associated one or more different TTI durations; and
prioritizing each bearer type of the two or more bearer types based at least in part on the associated one or more different TTI durations.

18. The method of claim 16, further comprising:
configuring the UE to transmit a buffer status report (BSR) based at least in part on the prioritized bearer types.

19. The method of claim 16, further comprising:
logically grouping the two or more bearer types into one or more logical groups based at least in part on a TTI duration of each bearer type; and
configuring the UE to transmit a BSR associated with each of the one or more logical groups.

20. The method of claim 19, wherein a priority of the two or more bearer types is determined independently for each logical group of the one or more logical groups.

21. The method of claim 16, wherein the prioritizing each bearer type further comprises:
identifying a first bearer type with a first bearer priority;
identifying a second bearer type with a second bearer priority that is lower than the first bearer priority; and
wherein the configuring the UE further comprises:
configuring the UE to prioritize the second bearer type to have a higher priority than the first bearer type when the second bearer type is to be transmitted using a shorter duration TTI than the first bearer type; and
configuring the UE to prioritize the first bearer type to have a higher priority than the second bearer type when the first bearer type is to be transmitted using a shorter duration TTI than, or a same duration TTI as, the second bearer type.

22. The method of claim 16, further comprising:
configuring the UE to transmit a first portion of a buffer status report (BSR) with buffer information associated with one or more higher priority bearer types ahead of a second portion of the BSR with buffer information associated with one or more lower priority bearer types.

23. The method of claim 22, further comprising:
configuring the UE to include buffer information in the BSR associated with an ongoing first transmission of a first bearer type based at least in part on whether a second transmission punctures the ongoing first transmission or is transmitted concurrently with the ongoing first transmission.

24. The method of claim 22, wherein the configuring the UE to transmit the BSR is performed through radio resource control (RRC) signaling transmitted to the UE.

25. A mobile device for wireless communication, comprising:
a processor;
memory in electronic communication with the processor; and
instructions stored in the memory and operable, when executed by the processor, to cause the mobile device to:
identify two or more bearers for an uplink data transmission from the mobile device to a network device, each bearer having a bearer type;
associate one or more different numerologies with each of the two or more bearers;
determine a group of bearers from the two or more bearers based at least in part on a numerology of the associated one or more different numerologies;
prioritize each bearer within the group of bearers based at least in part on the bearer type;
multiplex each bearer within the group of bearers together based at least in part on the prioritization; and
transmit the uplink data transmission during an uplink transmission time interval (TTI) based at least in part on the multiplexing.

26. The mobile device of claim 25, wherein the instructions are further executable by the processor to cause the mobile device to:
associate one or more different TTI durations with each of the two or more bearers; and
determine the group of bearers from the two or more bearer types based at least in part on a TTI duration of the associated one or more different TTI durations.

27. The mobile device of claim 25, wherein the instructions are further executable by the processor to cause the mobile device to:
transmit a buffer status report (BSR) associated with at least one of the group of bearers based at least in part on the prioritization.

28. The mobile device of claim 25, wherein the instructions are further executable by the processor to cause the mobile device to:
identify one or more logical channels for each of the bearers in the group of bearers; and
prioritize the identified logical channels based at least in part on the bearer type for each of the bearers in the group of bearers.

29. The mobile device of claim 25, wherein the instructions are further executable by the processor to cause the mobile device to:
logically group the two or more bearers into one or more logical groups based at least in part on a TTI duration of each bearer; and
transmit a buffer status report associated with at least one of the one or more logical groups.

30. A network device for wireless communication, comprising:
a processor;
memory in electronic communication with the processor; and instructions stored in the memory and operable, when executed by the processor, to cause the network device to:
identify two or more bearer types for uplink data transmissions from a mobile device;
associate one or more different numerologies with each of the two or more bearer types;
determine a group of bearers from the two or more bearer types based at least in part on a numerology of the associated one or more different numerologies;
prioritize each bearer type within the group of bearers based at least in part on the associated one or more different numerologies; and
configure the mobile device to transmit an uplink transmission during an uplink transmission time interval (TTI) based at least in part on the prioritization.

* * * * *